US010382712B1

(12) United States Patent
Forutanpour et al.

(10) Patent No.: US 10,382,712 B1
(45) Date of Patent: Aug. 13, 2019

(54) AUTOMATIC REMOVAL OF LENS FLARES FROM IMAGES

(71) Applicant: QUALCOMM Incorporated, San Diego, CA (US)

(72) Inventors: Bijan Forutanpour, San Diego, CA (US); Sairam Sundaresan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/052,522

(22) Filed: Aug. 1, 2018

(51) Int. Cl.
| *H04N 9/64* | (2006.01) |
| *H04N 5/357* | (2011.01) |
| *H04N 5/232* | (2006.01) |
| *G06T 5/00* | (2006.01) |
| *H04N 5/235* | (2006.01) |

(52) U.S. Cl.
CPC .......... *H04N 5/3572* (2013.01); *G06T 5/003* (2013.01); *H04N 5/2353* (2013.01); *H04N 5/232127* (2018.08)

(58) Field of Classification Search
CPC .................................................. H04N 5/3572
See application file for complete search history.

(56) References Cited

U.S. PATENT DOCUMENTS

| 7,158,099 B1 | 1/2007 | Berube et al. |
| 8,730,356 B2 | 5/2014 | Ansfield et al. |
| 9,578,208 B2 | 2/2017 | Tsuchiya et al. |
| 9,787,899 B1 | 10/2017 | Hinkel et al. |
| 9,936,105 B2 * | 4/2018 | Furuya ................... H04N 5/217 |
| 2013/0329132 A1 * | 12/2013 | Tico .......................... H04N 5/14 348/571 |
| 2017/0359534 A1 | 12/2017 | Li et al. |
| 2018/0089874 A1 * | 3/2018 | Wu ........................ G06T 11/001 |
| 2018/0338096 A1 * | 11/2018 | Matsunaga .......... H04N 5/3572 |

* cited by examiner

*Primary Examiner* — Gary C Vieaux
(74) *Attorney, Agent, or Firm* — Kilpatrick Townsend & Stockton, LLP

(57) ABSTRACT

Techniques and systems are provided for processing one or more images. In one example, a method of processing a plurality of images comprises: obtaining a first image captured using a first aperture setting; obtaining a second image captured using a second aperture setting, the first aperture setting being associated with a smaller aperture size than an aperture size associated with the second aperture setting; detecting pixels of the first image having lens flare; and generating an output image by combining the first image and the second image, the first image and the second image being combined by replacing the pixels of the first image having the lens flare with corresponding pixels of the second image.

30 Claims, 21 Drawing Sheets

|  |  |  |
|---|---|---|
| N1 | N2 | N3 |
| N4 | 1202C | N5 |
| N6 | N7 | N8 |

FIG. 12C

|  |  |  |
|---|---|---|
| 0 | 1 | 1 |
| 0 | 1 | 1 |
| 0 | 1 | 1 |

FIG. 12D

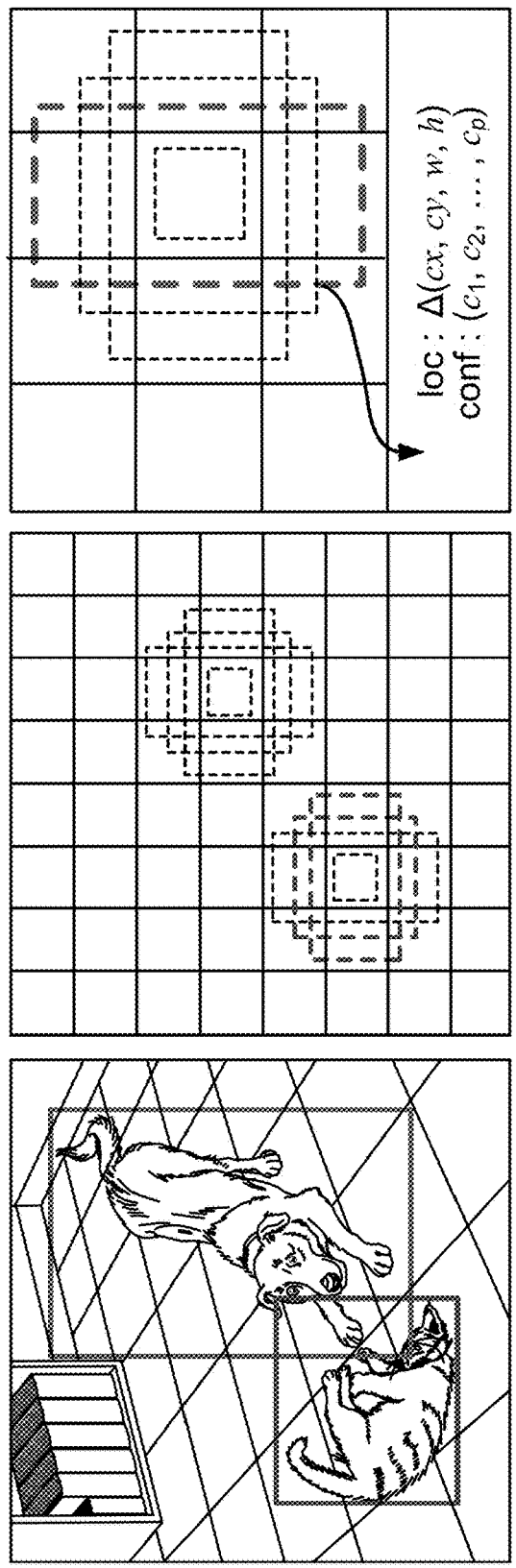

AUTOMATIC REMOVAL OF LENS FLARES FROM IMAGES

FIELD

The present disclosure generally relates to techniques and systems for automatically removing lens flares from images.

BACKGROUND

Many devices and systems allow a scene to be captured by generating image and/or video data of the scene. For example, a camera can be used to capture images of a scene for recreational use, for professional photography, for surveillance, among other applications. The image data from image capture devices and systems can be captured and output for processing and/or consumption.

A common optical phenomenon in photography is lens flare. From an aesthetic point of view, lens flares are often considered an undesirable artifact. Lens flares are caused by unintentional reflections and scattering of light from the surface of a camera lens or multiple lenses in a camera hardware structure. From a computer vision perspective, lens flares can interfere with many operations, such as image alignment, image stitching, object tracking, feature detection, among others. In 360-degree dual fisheye camera systems, stitching becomes a problem with undesirable discontinuity at the image seam line. For example, the lens flare in one of the fisheye images may not look like the lens flare in the other fisheye image.

BRIEF SUMMARY

In some examples, techniques and systems are described for removing lens flares from images. For example, the techniques and systems can use one or more cameras to capture multiple images with different aperture settings, and can combine the multiple images together to remove lens flare. The systems can include a dual camera system or a single camera system. For example, a first image and a second image can be captured with different camera aperture settings. For the first image, the aperture can be set to be as small as desirable by a user or can be set automatically by the camera system. The small aperture size allows the first image to be captured with sharp detail. For the second image, the aperture can be set to be a size that is larger than the aperture size used to capture the first image. The larger aperture size reduces or eliminates lens flares in the second image. The aperture size used for capturing the second image can be set to be as large as needed to remove the lens flare or to greatly reduce the lens flare from the second image by a suitable or desired amount. Pixels from the first and second images can then be combined to remove lens flare while retaining image detail.

In some cases, the multiple images can be captured at a same exposure, but with the different aperture settings. The images can be captured with a same exposure at different aperture settings by using different shutter speeds for the multiple images and/or using different lens sensitivity settings for the one or more cameras when capturing the images. For instance, the shutter speeds used for capturing the first image and the second image (from the example above) can be set such that overall exposures of the two images are identical or very close to one another.

According to at least one example, a method of processing a plurality of images is provided. The method includes obtaining a first image captured using a first aperture setting, obtaining a second image captured using a second aperture setting, the first aperture setting being associated with a smaller aperture size than an aperture size associated with the second aperture setting; detecting pixels of the first image having lens flare; and generating an output image by combining the first image and the second image, the first image and the second image being combined by replacing the pixels of the first image having the lens flare with corresponding pixels of the second image.

In another example, an apparatus for processing a plurality of images is provided that includes a memory configured to store the plurality of images including a first image captured using a first aperture setting and a second image captured using a second aperture setting, the first aperture setting being associated with a smaller aperture size than an aperture size associated with the second aperture setting. The apparatus further includes a processor. The processor is configured to and can obtain the first image. The processor can also obtain the second image. The processor can detect pixels of the first image having lens flare, and generate an output image by combining the first image and the second image, the first image and the second image being combined by replacing the pixels of the first image having the lens flare with corresponding pixels of the second image.

In another example, a non-transitory computer-readable medium is provided that has stored thereon instructions that, when executed by one or more processors, cause the one or more processor to: obtain a first image captured using a first aperture setting, obtain a second image using a second aperture setting, the first aperture setting being associated with a smaller aperture size than an aperture size associated with the second aperture setting; detect pixels of the first image having lens flare; and generate an output image by combining the first image and the second image, the first image and the second image being combined by replacing the pixels of the first image having the lens flare with corresponding pixels of the second image.

In another example, an apparatus for processing a plurality of images is provided. The apparatus includes means for obtaining a first image captured using a first aperture setting, means for obtaining a second image using a second aperture setting, the first aperture setting being associated with a smaller aperture size than an aperture size associated with the second aperture setting, means for detecting pixels of the first image having lens flare, and means for generating an output image by combining the first image and the second image, the first image and the second image being combined by replacing the pixels of the first image having the lens flare with corresponding pixels of the second image.

In some aspects, the methods, apparatuses, and computer-readable medium described above further comprise: capturing the first image and the second image at a same exposure. The first image and the second image can be captured at the same exposure by adjusting a shutter speed of at least one camera.

In some examples, the methods, apparatuses, and computer-readable medium described above further comprise: generating a binary image mask based on pixels of the first image, the binary image mask including a first value for the pixels of the first image that have the lens flare and a second value for pixels in the first image that do not have the lens flare; and combining the first image and the second image using the binary image mask. In some examples, combining the first image and the second image using the binary image mask includes using one or more of a value of a pixel of the first image or a value of a corresponding pixel of the second image for a corresponding pixel of the output image based on a value determined for a corresponding pixel of the binary image mask. The pixel of the first image can have a same location as a location of the corresponding pixel of the second image and a location of the corresponding pixel of the binary image mask.

In some examples, the value determined for the corresponding pixel of the binary image mask includes the first value or the second value. In some examples, the value determined for the corresponding pixel of the binary image mask indicates a percentage of the corresponding pixel of the second image to use for the corresponding pixel of the output image. The corresponding pixel of the output image can have a same location as the location of the corresponding pixel of the second image.

In some examples, the methods, apparatuses, and computer-readable medium described above further comprise: determining the value for the corresponding pixel of the binary image mask using an initial value of the corresponding pixel of the binary image mask and values of a plurality of pixels neighboring the corresponding pixel of the binary image mask. The value for the corresponding pixel of the binary image mask can be determined by averaging the initial value of the corresponding pixel of the binary image mask and the values of the plurality of pixels neighboring the corresponding pixel of the binary image mask. The value for the corresponding pixel of the binary image mask can be included in a blurred image mask.

In some examples, the methods, apparatuses, and computer-readable medium described above further comprise: aligning the first image and the second image; color matching the aligned first image and the second image; and detecting the pixels of the first image having the lens flare after the first image and the second image are color matched.

In some examples, the methods, apparatuses, and computer-readable medium described above further comprise: refocusing a focus point of a camera to a point within a lens flare area of the first image, the lens flare area corresponding to the pixels of the first image having the lens flare; and capturing the second image using the refocused focus point.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

Illustrative embodiments of the present application are described in detail below with reference to the following drawing figures:

FIG. 12C is a diagram illustrating an example of a group of neighboring pixel locations around a pixel location of the binary image mask generated using the small aperture image illustrated in FIG. 7, in accordance with some examples.

FIG. 12D is a diagram illustrating an example of initial binary values assigned to the group of neighboring pixel locations and the pixel location of the binary image mask, in accordance with some examples.

FIG. 17A-FIG. 17C are diagrams illustrating an example of a single-shot object detector, in accordance with some examples.

DETAILED DESCRIPTION

Figure 1:
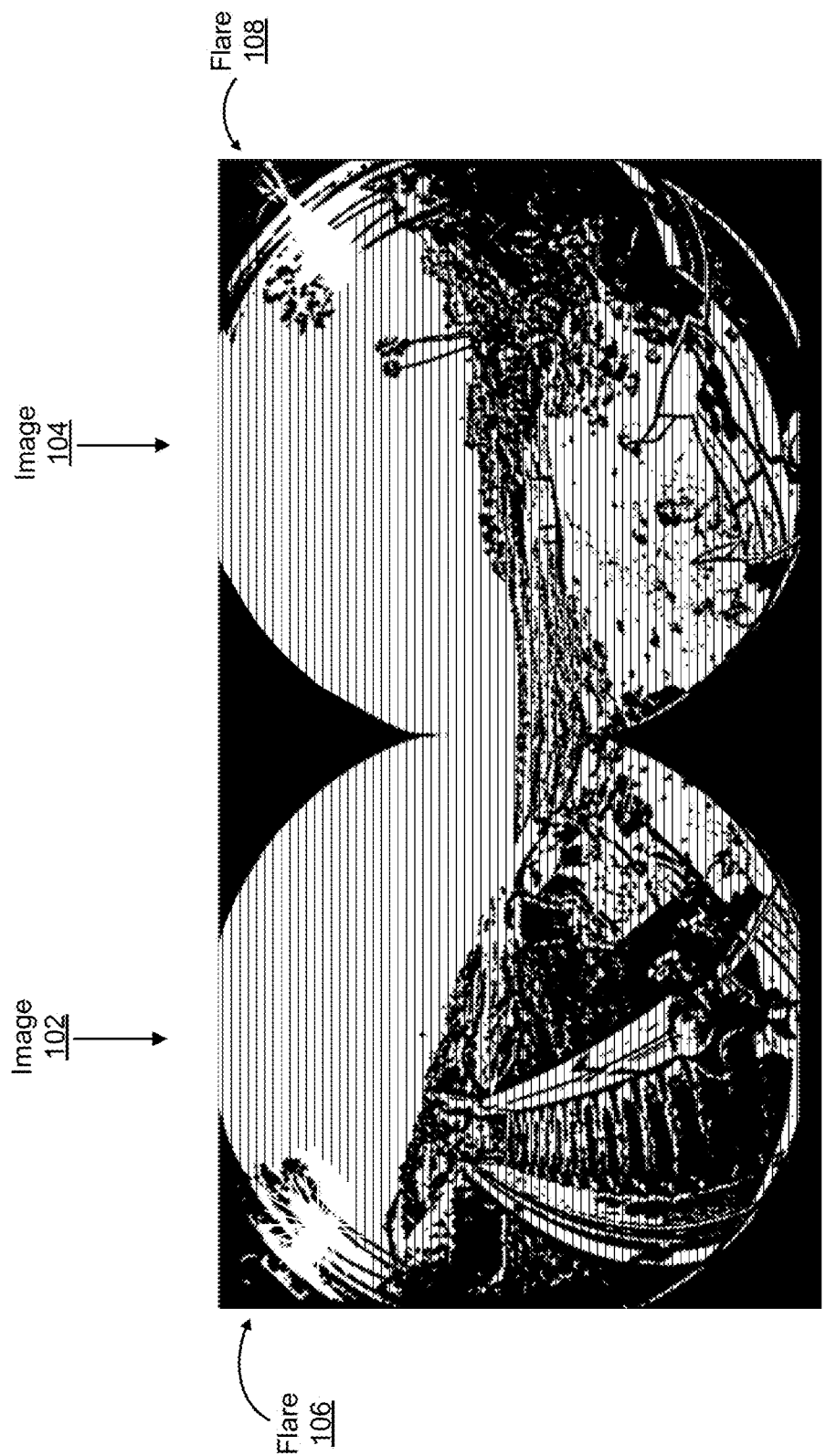
FIG. 1 is a photograph illustrating two fisheye images having lens flares, in accordance with some examples.

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the application. However, it will be apparent that various embodiments may be practiced without these specific details. The figures and description are not intended to be restrictive.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the application as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

Furthermore, embodiments may be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a computer-readable or machine-readable medium. A processor(s) may perform the necessary tasks.

As noted previously, a common optical phenomenon in photography is lens flare. Lens flares are caused by unintentional reflections and scattering of light from the surface of a camera lens or multiple lenses in a camera hardware structure. For example, lens flare occurs through light scattered by the imaging mechanism itself, such as based on internal reflection and scattering from material imperfections of a lens. Lenses that have many elements (e.g., zooms) can exhibit greater lens flare due to the large number of interfaces at which internal scattering may occur. Lens flare can cause undesirable visual artifacts in images. For example, lens flare can show up as visible artifacts and/or as a haze across an image. Lens flares can also interfere with many operations from a Computer Vision perspective, such as image alignment, image stitching, object tracking, feature detection, among others. In 360-degree dual fisheye camera systems, stitching becomes a problem with undesirable discontinuity at the image seam line. Lens flare can become more prevalent when bright light sources are captured by the camera. For example, lens flares can be present in an image that includes the sun or in an image captured when a camera lens is pointed in the direction of the sun.

FIG. 1 shows two fisheye images 102 and 104 that are provided in a single image. The two fisheye images 102 and 104 can be captured using a dual fisheye camera (or 360-degree camera). A dual fisheye camera has a first lens (or camera) pointing forward that covers a field of view of 180-degrees or more, and a second lens (or camera) facing opposite of the first lens that also covers a field of view of 180-degrees or more. Lens flares may not look the same or have the same characteristics between two lenses on two different cameras. For instance, as shown in FIG. 1, the first fisheye image 102 has a lens flare 106 and the second fisheye image 104 has a lens flare 108. As can be seen, the lens flare 106 in the first fisheye image 102 appears differently than the lens flare 108 in the second fisheye image 104, which can cause a discontinuity to appear when the two fisheye images 102 and 104 are stitched together into a spherical geometry for rendering.

Figure 2:
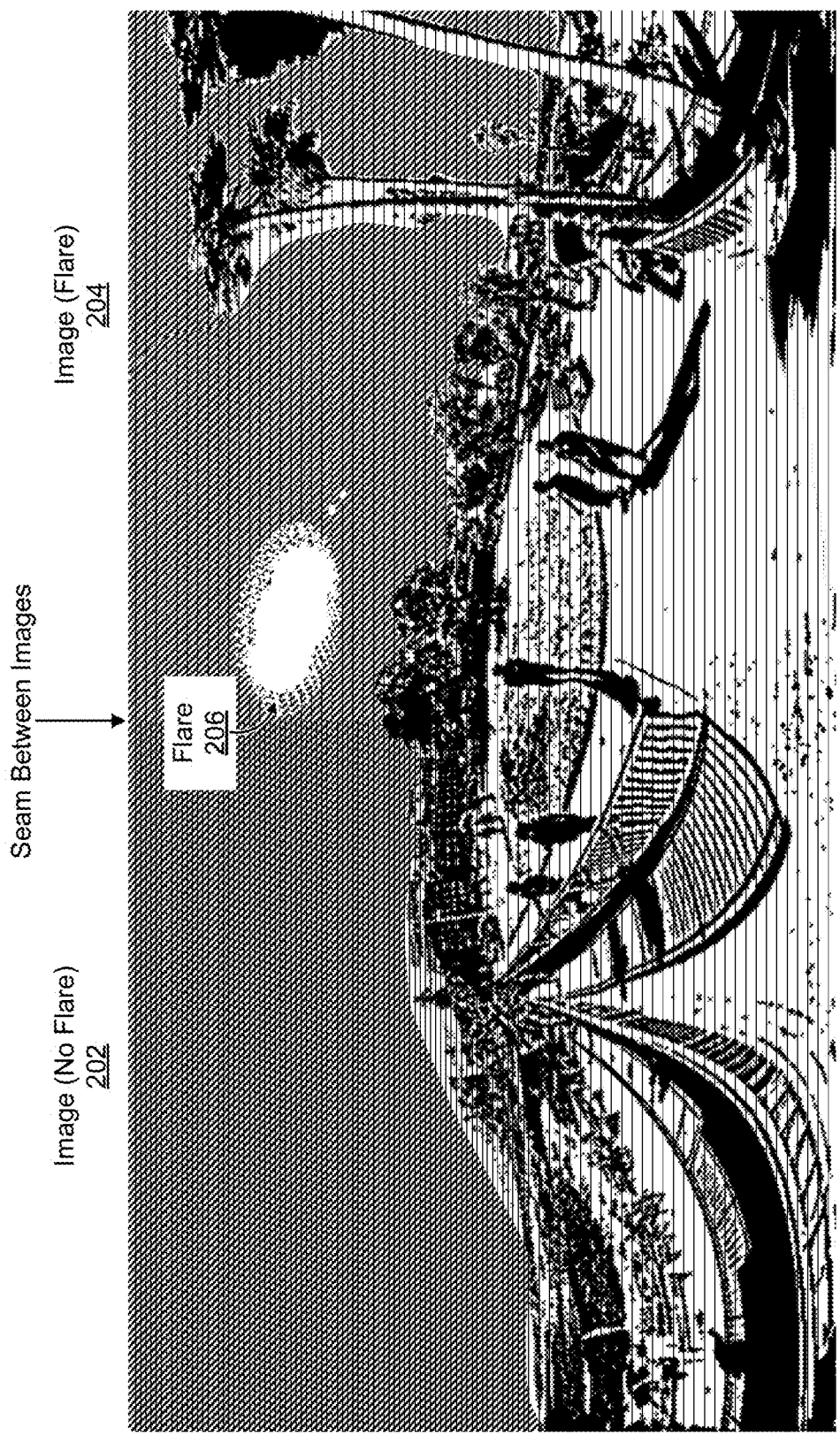
FIG. 2 is a photograph illustrating two fisheye images, with one image having lens flare and the other image not having a lens flare, in accordance with some embodiments.

FIG. 2 is a photograph illustrating another example of two fisheye images that exhibit different lens flare characteristics. As can be seen, the image 202 to the left of the seam between the two images has no lens flare, while the image 204 to the right of the seam has lens flare 206. Such a phenomenon can cause visual discontinuities between the two images when stitched together.

Systems, methods, and computer-readable media are described herein for automatically removing lens flares from images. An example of a lens flare removal system 302 is described below with respect to FIG. 3. As described in more detail below, lens flare can be removed by capturing multiple images using different aperture settings. One or more cameras can be used to capture the multiple images with the different aperture settings. For instance, the systems can include a dual camera system or a single camera system. For a first image (captured by a first camera), the aperture can be set to be as small as desirable by a user or can be set automatically by the camera system. The small aperture size allows the first image to be captured with sharp detail. For a second image (captured by the first camera or by a second camera), the aperture can be set to be a size that is larger than the aperture size used to capture the first image. The larger aperture size reduces or eliminates lens flares in the second image. The aperture size used for capturing the second image can be set to be as large as needed to remove the lens flare or to greatly reduce the lens flare from the second image by a suitable or desired amount. Pixels from the first and second images can then be combined to remove the lens flare while retaining image detail. Herein, "first image" may refer to a small aperture image (captured using a smaller aperture than the aperture size used for capturing the second image), and "second image" may refer to a large aperture image (captured using a larger aperture size than the aperture size used for capturing the first image).

In some cases, the multiple images can be captured at a same exposure, but with the different aperture settings. The images can be captured with a same exposure at different aperture settings by using different shutter speeds for the multiple images and/or using different lens sensitivity settings for the one or more cameras when capturing the images. For instance, the shutter speeds used for capturing the first image and the second image (from the example above) can be set such that overall exposures of the two images are identical or very close to one another.

As noted above, the lens flare removal technique described can be performed using a dual camera system or a single camera system. For example, the lens removal technique can be performed using a dual camera system. Dual camera systems are present in many mobile devices. Such a dual camera architecture can be leveraged to solve the lens flare problem by taking at least two images (e.g., first and second images) simultaneously with different camera aperture and shutter speed settings. The first and second images can then be combined to remove flare while retaining image detail. For a first camera of the dual camera system that captures the first image, the aperture can be set to be as small as desirable by a user or automatically by the camera system. In some cases, the shutter speed of the first camera can be set such that overall exposure is identical or very close to the second camera when the second image is captured. In some cases, instead of or in addition to adjusting shutter speeds, lens sensitivity settings can be set so that the exposure is identical or close to that of the second camera when capturing the second image. For the second camera of the dual camera system that captures the second image, the aperture can be set to be a size that is larger than the aperture size used to capture the first image. As noted above, the larger aperture size reduces or eliminates lens flares in the second image. The shutter speed (and/or lens sensitivity settings) for the second camera can be set such that overall exposure is identical or very close to the first camera.

The lens removal technique can also be performed using a single camera system. Using the single camera, multiple images (including the first image and the second image) can be taken (e.g., in burst mode) with different camera aperture settings, with the first image captured using a smaller aperture size setting of a camera and the second image captured using a larger aperture size setting of the same camera. In some cases, the multiple images can be captured with the different aperture settings, while keeping the exposure constant by adjusting other parameters (e.g., shutter speed, lens sensitivity settings, and/or the like). The multiple images (e.g., the first image and the second image) can be combined to remove flare while retaining image detail.

Using either a dual camera or single camera system, at least two images are provided. The first image (with the smaller aperture size) contains the lens flare, yet has sharp detail in the rest of the image. The second image (with larger aperture size) has eliminated or greatly reduced lens flare, but at the cost of less image sharpness due to larger aperture sizes decreasing the sharpness in the details of the image. Pixels from the second image with reduced/eliminated lens flares can be combined with the first image (with a smaller aperture size and having sharper details) in order to obtain a final image with sharp details, but without lens flare. For example, the pixels of the lens flare areas of the first image (the sharper image) can be replaced (e.g., by smooth blending) with pixels from the second image taken without the lens flare.

Areas of image pixels in the first image containing lens flares can be detected by image processing, machine learning using trained neural networks (e.g., a classification network), a combination of image processing and machine learning, or using any other suitable technique. A binary image mask can be generated that includes a first value for pixels that have lens flare and a second value for pixels that do not have lens flare. In one illustrative example, the first value can be a 1 and the second value can be a 0. In another illustrative example, the first value can be a 0 and the second value can be a 1. In some case, the 1 value can correspond to a white color, in which case pixels assigned a value of 1 are white. In such cases, the 0 value can correspond to a black color, in which case pixels assigned a value of 0 are black.

The binary image mask can be used to blend together regions of the two (or more) input images to generate the final output image. In some cases, pixels of the binary image mask can be associated with a blend matte value (or alpha channel value) that indicates a percentage of the pixel from the second image to use for the lens flare area of the final image. For example, if a pixel (e.g., at an edge of the lens flare area) in the mask has a blend matte value of 0.5, 50% of the pixel value from the second image can be combined with 50% of the pixel value from the first image (e.g., using a technique of "A over B compositing" as to be described below). The pixel values can be combined on a per-color-component basis. For example, the red pixel values of the two images can be composited, the green pixel values of the two images can be composited, and the blue pixel values of the two images can be composited. The blend matte value for a pixel in the binary image mask can be determined using an initial value of the pixel of the binary image mask and also using values of a plurality of pixels neighboring the pixel of the binary image mask. For example, the blend matte value for the pixel of the binary image mask can be determined by averaging the initial value of the pixel (e.g., a 0 or a 1) and the values of the plurality of pixels neighboring the pixel of the binary image mask. An example of determining a blend matte value for a binary image mask pixel is described below with respect to FIG. 12C and FIG. 12D.

In some examples, image alignment and color balancing (or color matching) can be performed on the first and second images before combining the images together. For example, the first and second images can be aligned and then color matched before detecting the pixels in the first image that have lens flare.

In some examples, the areas of the lens flare(s) may be used to reset the focus of the image capture for the second image, which has a larger aperture size and creates a softer (blurrier) image by default. The focus can be reset by setting the camera focus point to be focused (e.g., centered or near-centered) on the lens flare area(s) that were detected in the first image, and the second image can then be captured using the new focus point. In a single camera system, the camera can first capture the first image, and the focus of the camera can be reset based on the lens flare(s) detected in the first image prior to capturing of the second image. In a dual camera system, a first camera can capture the first image, and the focus of a second camera can be reset based on the lens flare(s) detected in the first image prior to capturing of the second image. Resetting the focus point can help improve the sharpness of detail in the captured second image in the lens flare area. For example, when the second image (with larger aperture size and thus eliminated or reduced lens flare) is combined with the first image (with lens flare), the sharper, more clear pixels from the second image that have no lens flare are used for patching the portions of the first image that were detected as having the lens flare. An example of resetting the focus for capturing the image without lens flare (using an larger aperture size) is described below with respect to FIG. 13.

Figure 3:
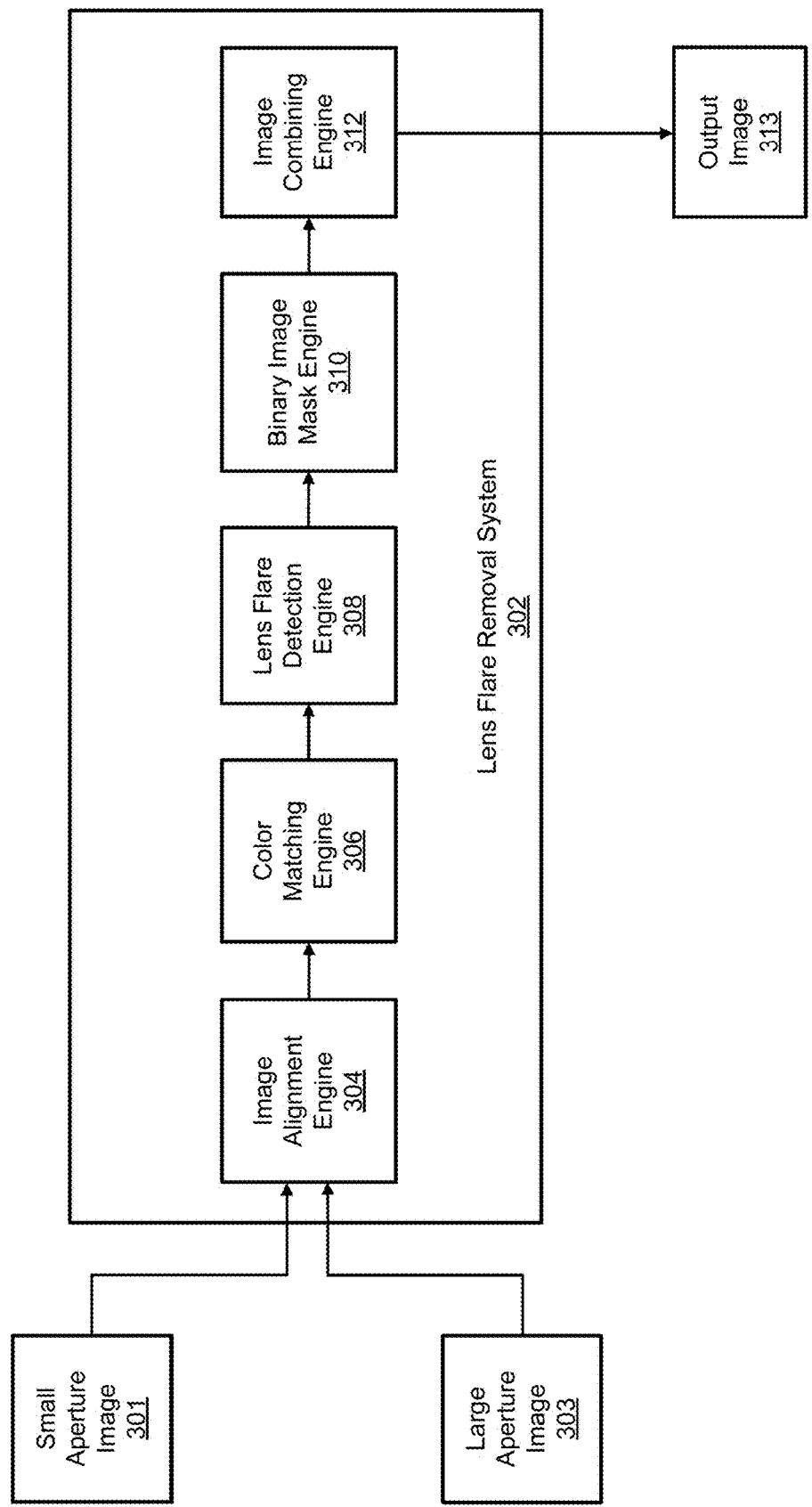
FIG. 3 is a block diagram illustrating an example of a lens flare removal system, in accordance with some examples.

FIG. 3 is a block diagram illustrating an example of a lens flare removal system 302. The lens flare removal system 302 includes various components, including an image alignment engine 304, a color matching engine 306, a lens flare detection engine 308, a binary image mask engine 310, and an image combining engine 312. The components of the lens flare removal system 302 can include electronic circuits or other electronic hardware, which can include programmable electronic circuits (e.g., microprocessors, or other suitable electronic circuits), computer software, firmware, or any combination thereof, to perform the various operations described herein. While the lens flare removal system 302 is shown to include certain components, one of ordinary skill will appreciate that the lens flare removal system 302 can include more or fewer components than those shown in FIG. 3. For example, the lens flare removal system 302 may include, in some instances, one or more memory and/or processing devices that are not shown in FIG. 3.

Figure 4:
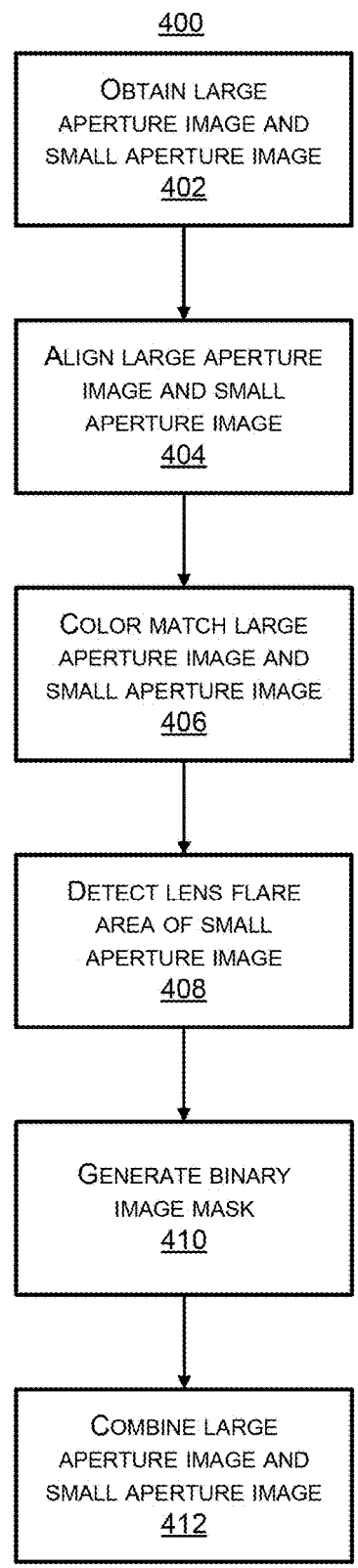
FIG. 4 is a flowchart illustrating an example of a process for removing lens flare, in accordance with some examples.

Multiple images can be processed by the components of the lens flare removal system 302 to provide final output images that have reduced or no lens flare. The operation of the lens flare removal system 302 will be described with respect to FIG. 4, which is a flowchart illustrating an example of a process 400 for removing lens flare. The process 400 can be performed by the lens flare removal system 302. In some examples, the process 400 can be performed in response to an image being captured by a camera or a computing device (e.g., a mobile device, or the like) that includes a camera. In one illustrative example, the process 400 can be invoked in response to selection of a shutter button, a graphical icon that causes an image to be captured, or other image capture selection option of a camera or computing device.

At block 402, the process 400 includes obtaining a large aperture image (e.g., second image) and a small aperture image (e.g., first image). For example, the lens flare removal system 302 can receive or obtain a small aperture image 301 and a large aperture image 303 from one or more image sources. In some cases, the large aperture image and the small aperture image can be captured at a same resolution so that the two images are the same size. In some cases, the large aperture image and the small aperture image can be captured at different resolutions. In some examples, the small aperture image 301 can include an image that is captured based on normal use of a camera, and the large aperture image 303 can be automatically captured by the camera. For instance, a user can select the desired settings of the camera, and can point the camera at a scene and select a shutter button (or other image capture selection option) to capture the small aperture image 301. In such examples, the camera (or an additional camera of the computing device) can automatically capture the large aperture image 303 of the same scene in response to the small aperture image 301 being taken by the camera. The small aperture image 301 and the large aperture image 303 can be captured at the same time or very close in time (e.g., within 33 milliseconds of one another, within 16 milliseconds of one another, or the like), so that the two images 301 and 303 capture the same scene at the same or similar point in time.

In some cases, the large aperture and small aperture images (e.g., images 301 and 303) can include still images (not part of a sequence of video frames) captured by one or more still cameras. For instance, the large aperture and small aperture images can each include a single image captured using one or more digital cameras or other image capture device. In some cases, the large aperture and small aperture images can be video frames of one or more video sequences captured using one or more video cameras. Video frames can also be referred to herein as images, video pictures, or pictures.

The one or more image sources from which the small aperture image and the large aperture image (e.g., images 301 and 303) are received can include an image capture device and/or a video capture device (e.g., a digital camera, a digital video camera, a phone with a camera, a tablet with a camera, or other suitable capture device), an image and/or video storage device, an image and/or video archive containing stored images, an image and/or video server or content provider providing image and/or video data, an image and/or video feed interface receiving images from a video server or content provider, a computer graphics system for generating computer graphics image and/or video data, a combination of such sources, or other source of image content.

The lens flare removal system 302 can be part of a computing device. In some cases, the computing device (or devices) that includes the lens flare removal system 302 can include one or more wireless transceivers for wireless communications and/or a display for displaying one or more images. In some examples, the computing device that include the lens flare removal system 302 can be an electronic device, such as a camera (e.g., a digital camera, an IP camera, a video camera, a camera phone, a video phone, or other suitable capture device), a mobile or stationary telephone handset (e.g., smartphone, cellular telephone, or the like), a desktop computer, a laptop or notebook computer, a tablet computer, a set-top box, a television, a display device, a digital media player, a video gaming console, a video streaming device, or any other suitable electronic device. In some implementations, the lens flare removal system 302 and the one or more image sources can be part of the same computing device. For example, in some cases, a camera, phone, tablet, and/or other device with an image source (e.g., a camera, storage, or the like) can include an integrated lens flare removal system. In some implementations, the lens flare removal system 302 and the one or more image sources can be part of separate computing devices. In one illustrative example, the one or more image sources can include one or more cameras, and the computing device including the lens flare removal system 302 can include a mobile or stationary telephone handset, a desktop computer, a laptop or notebook computer, a tablet computer, or other computing device.

In some examples, the large aperture and small aperture images (e.g., the small aperture image 301 and the large aperture image 303) can be captured using a dual camera system of a computing device. For instance, the small aperture image 301 can be captured using a first camera of the dual camera system, and the large aperture image 303 can be captured using a second camera of the dual camera system. The dual camera architecture can capture the small aperture image 301 and the large aperture image 303 simultaneously with different camera aperture settings for the first camera and the second camera.

In some examples, the small aperture image and the large aperture image (e.g. images 301 and 303) can be captured using a single camera system of a computing device. In one illustrative example, the small aperture image 301 and the large aperture image 303 can be captured by the single camera using a burst mode. Burst mode is a common image capture function that includes capturing multiple images in succession in response to a shutter button being pressed or being held down for a period of time. Any other suitable camera modes for capturing multiple images can also be used to capture the small aperture image 301 and the large aperture image 303 using a single camera. The single camera system can capture the small aperture image 301 and the large aperture image 303 using different camera aperture settings for each of the images 301 and 303.

Figure 5:
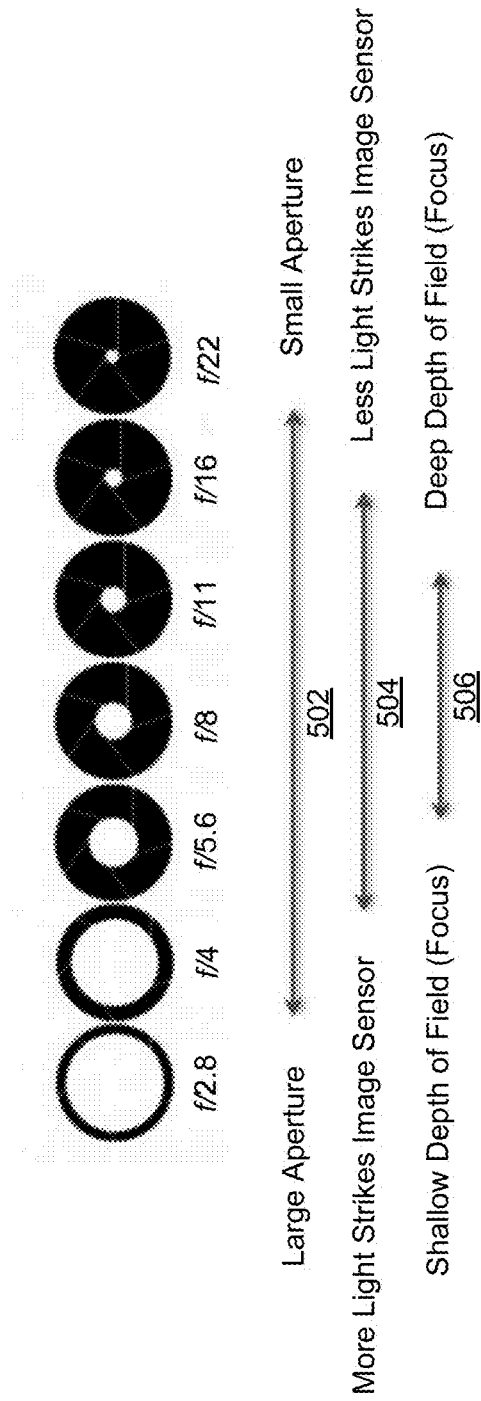
FIG. 5 is a diagram illustrating an example of a camera aperture scale, in accordance with some examples.
Figure 6A:
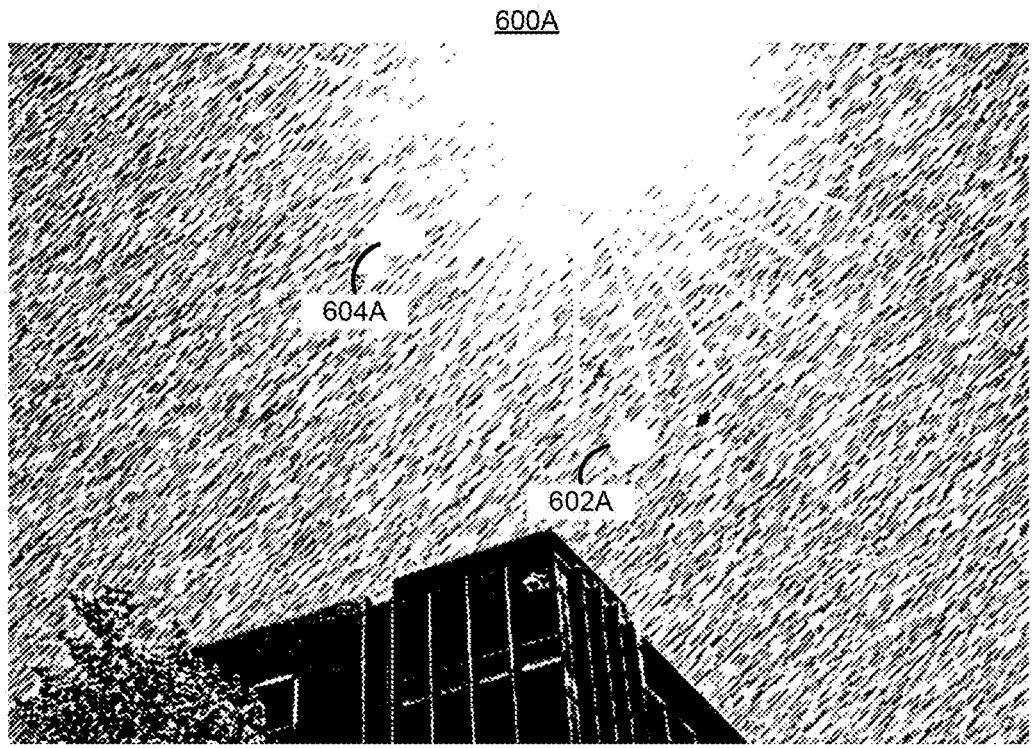
FIG. 6A-FIG. 6D are images illustrating an effect on lens flares by increasing camera aperture size, in accordance with some embodiments.
Figure 6B:
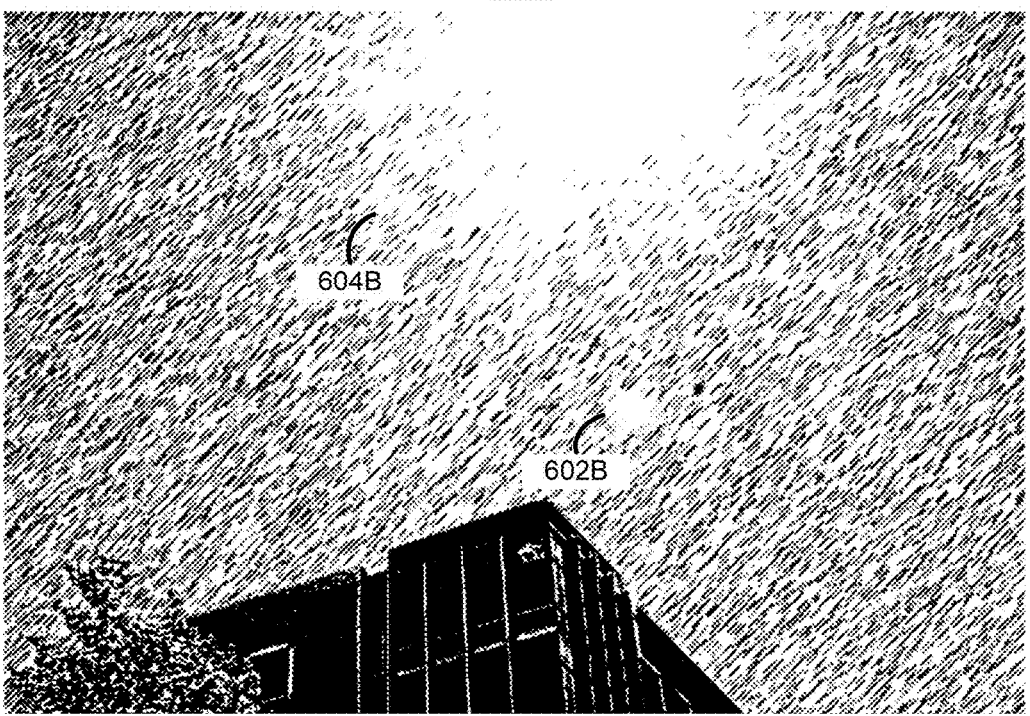
Figure 6C:
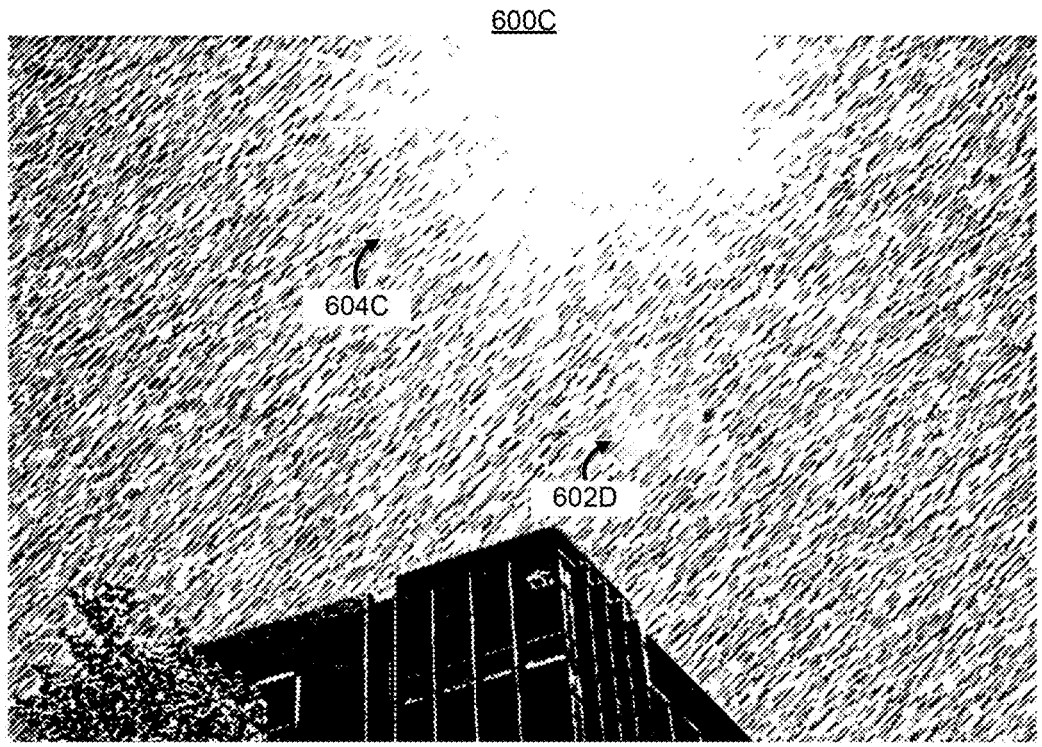
Figure 6D:
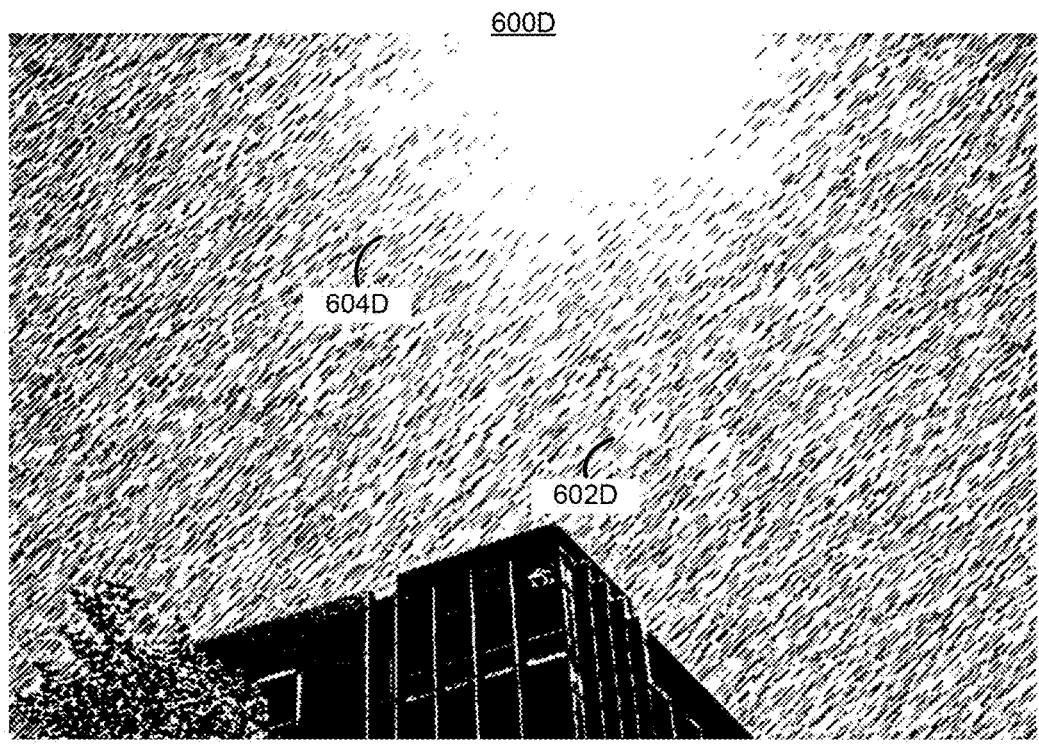

The different aperture settings for the small aperture image and the large aperture image can be set (manually by a user or automatically by the camera system) to be as small or as large as desirable. In some cases, an aperture setting can include an f-stop setting of a camera. FIG. 5 is a diagram illustrating an example of a camera aperture scale 502. The aperture of a camera can be a set of blades that is part of or coupled with the lens of the camera. The aperture mechanically controls how much light will enter the camera when an image is captured. The aperture setting controls the opening of the aperture, and thus controls how much light is allowed to enter the camera. Aperture sizes are measured by f-stops. A high f-stop corresponds to a small aperture opening, and a low f-stop corresponds to a more open aperture opening. Examples of different f-stop settings (and thus different aperture opening sizes) are shown in FIG. 5. The f-stop settings include f-stops of f/2.8, f/4, f/5.6, f/8, f/11, f/16, and f/22. As shown, the opening of the aperture is wide open with an f-stop of f/2.8, while the opening of the aperture is very small with an f-stop of f/22.

The openness of the aperture (based on the f-stop setting) controls the amount of light that can strike the image sensor (or film) of the camera, as well as the depth of field (or focus) of the camera. A light range 504 and a focus range 506 are shown as corresponding to the aperture scale 502. As shown by the light range 504, a larger aperture opening (corresponding to a low f-stop setting) allows more light to strike the sensor, while a smaller aperture opening (corresponding to a high f-stop setting) allows less light to strike the sensor. In one illustrative example, changing the aperture from an f-stop of f/4 to an f-stop of f/5.6 halves the amount of light passing through the lens and halves the brightness of the image that falls on the image sensor. A brighter image results when more light is allowed to enter the aperture (and thus to strike the camera sensor) when capturing an image. Allowing less light to enter the aperture results in a darker image.

As shown by the focus range 506, a larger aperture opening also provides a shallower depth of field (and thus less focus), while a smaller aperture opening provides a deeper depth of field (and thus more focus). For example, changing the value of the f-stop setting changes the depth of field, which is the distance in front of or behind the focus point that appears to be in focus. The higher the f-stop value, the greater the distance in front of and behind the focus point, while the lower the f-stop value, the shorter the distance in front of and behind the focus point. The depth of field (or focus) affects how much of the image is sharp, and how much is blurry. The higher the focus an image has, the sharper the pixels in the image appear, providing more detail for the objects that appear in the image. A larger aperture opening results in a blurrier image with less sharpness and detail.

The aperture setting for the small aperture image can be set (e.g., manually or automatically) so that a certain level of focus and brightness is achieved, without consideration of whether lens flare will be present in the small aperture image. For example, a user can select an f-stop setting that provides a desired level of sharpness (based on the focus) and brightness for the small aperture image. In another example, a user can select a pre-defined setting that provides a certain level of sharpness and brightness, and the camera can automatically set the f-stop setting to achieve the parameters defined by the pre-defined setting. The user can then select a shutter button (or other image capture selection option) to capture the small aperture image 301.

The aperture setting for the large aperture image can be set (e.g., manually or automatically) so that any lens flare in the large aperture image is removed or reduced by a certain amount. The aperture setting for the large aperture image can be set to any suitable value as long as the aperture size is larger than the aperture size used to capture the small aperture image. In one illustrative example, the aperture setting for the large aperture image can be set so that any lens flare in the image is not visible or not noticeable by the human eye. For instance, the aperture setting for the large aperture image can be set to be a maximum aperture setting of the camera (e.g., an f-stop setting of f/2.8), which will reduce or remove any lens flare in the image so that the lens flare is not visible or not noticeable by the human eye. In such examples, the maximum aperture setting for the camera can introduce blurriness to the non-flare parts of the image. In some examples, the process 1300 described with respect to FIG. 13 below can be used to reduce the blurriness in the image caused by the large aperture setting. In some cases, when capturing a large aperture image, the camera can automatically select the appropriate aperture setting to eliminate or reduce any lens flare in the image by a certain amount (e.g., so that the lens flare is not visible or not noticeable by the human eye). For instance, the aperture setting can be incrementally adjusted for each image until the lens flare is not visible.

FIG. 6A-FIG. 6D are images illustrating an effect on lens flares in images by increasing the aperture size of the camera capturing the images. The aperture opening of the camera can be increased in order to reduce or remove lens flares. The image 600A of FIG. 6A was captured using a first aperture setting. In one illustrative example, the first aperture setting can include an f-stop of f/8. As can be seen, the first aperture setting allowed several lens flares (including lens flare 602A and lens flare 604A) to be visible in the image 600A. The image 600B of FIG. 6B was captured using a second aperture setting, which corresponds to a larger aperture opening than the aperture opening of FIG. 6A, thus allowing more light to strike the image sensor (or film). In one illustrative example, the second aperture setting can include an f-stop of f/5.6. As shown, the lens flare 604B (corresponding to the lens flare 604A) and the lens flare 602B (corresponding to the lens flare 602A) are slightly visibly reduced by the increased aperture opening. For example, the lens flare 604B is barely visible in the image 600B, while the lens flare 602B is less visible than the corresponding lens flare 602A shown in FIG. 6A.

As the aperture opening of the camera is increased, the lens flares are further reduced or removed. For example, the image 600C shown in FIG. 6C was captured using a third aperture setting that corresponds to a larger aperture opening than the first and second aperture settings from FIG. 6A and FIG. 6B. In one illustrative example, the third aperture setting can include an f-stop of f/4. As shown in the image 600C, the lens flare 604C (corresponding to the lens flare 604A) is not visible, while the lens flare 602C (corresponding to the lens flare 602A) is barely visible. The image 600D of FIG. 6D was captured using a fourth aperture setting, which corresponds to a larger aperture opening than the first, second, and third aperture settings of FIGS. 6A-6C. In one illustrative example, the fourth aperture setting can include an f-stop of f/2.8. Both the lens flare 604D (corresponding to the lens flare 604A) and the lens flare 602D (corresponding to the lens flare 602A) are not visible in the image 600D.

In some implementations, the small aperture image and the large aperture image (e.g., the small aperture image 301 and the large aperture image 303) can be captured with a same exposure by adjusting parameters of the camera. Exposure corresponds to how much light enters the camera and how the film or image sensor reacts to the light. For example, exposure is the amount of light per unit area (the image plane illuminance times the exposure time) reaching a photographic film or electronic image sensor. The exposure is determined based on the shutter speed, the aperture opening of the lens, the sensitivity of image sensor (or film), and the luminance in the scene. By having a common exposure, the small aperture image and the large aperture image will have common color and brightness characteristics across the two images, which can help when performing image alignment and color matching, and when combining the pixels of the two images.

In some cases, the shutter speed of the camera can be controlled when capturing the small and large aperture images in order to capture the two images with a common exposure. The aperture controls the amount of light that reaches the image sensor (or film), and the shutter speed controls the amount of time the light shines on the image sensor (or film). For instance, the shutter speed can be slowed down when capturing the small aperture image, allowing more time for the light to reach the camera sensor, so that the overall exposure of the small aperture image is identical or very close to that used for capturing the large aperture image. In another example, the shutter speed can be increased when capturing the large aperture image, allowing less time for the light to reach the camera sensor, so that the overall exposure of the large aperture image is identical or very close to that used for capturing the small aperture image. Any combinations of aperture settings and shutter speeds can be used for capturing the small aperture and large aperture images in order to obtain a common exposure for the images. In some cases, the aperture setting and shutter speed can be set for capturing the small aperture image in order to achieve a desired image quality (e.g., a bright image, a dark image, a sharp image with all objects in focus, an image with a particular object in focus and the remainder of the image being blurry, or other desired quality), and the shutter speed for capturing the large aperture image can be set so that the exposure is the same as that used for capturing the small aperture image. In such cases, the shutter speed used for the large aperture image will be determined according to the aperture setting used for eliminating or reducing the lens flare from the large aperture image.

In some cases, instead of or in addition to adjusting shutter speeds when capturing the small and large aperture images, lens sensitivity settings can be adjusted so that the exposures are identical or close to one another when capturing the large aperture and small aperture images. For example, an "ISO sensitivity" of the camera can be adjusted to make the image sensor more or less sensitive to light. For example, if the ISO sensitivity of the camera is doubled, the amount of light reaching the image sensor required for a suitable exposure is halved. In one illustrative example, if the ISO sensitivity of the camera is increased by one stop from ISO 100 to ISO 200, an image can be captured with the shutter speed one stop faster or with the aperture value one f-stop narrower.

Returning to FIG. 4, the process 400 includes aligning the large aperture image and the small aperture image at block 404. The images can be aligned by the image alignment engine 304 of the lens flare removal system 302. As noted above, the large aperture image and the small aperture image can be captured at a same resolution so that the two images are the same size. In some cases, the large aperture image and the small aperture image can be captured at different resolutions. When the large aperture image and the small aperture image are captured at different resolutions, the smaller image can be upscaled and/or the larger image can be downscaled so that the images are a common size. Additionally, images may be warped area by area as necessary in order to be properly aligned in all areas of the image. In one illustrative example, the corner areas of two fisheye images (e.g., small aperture and large aperture fisheye images) can be warped before being aligned.

Any suitable image alignment technique can be used to align the large aperture image and the small aperture image (e.g., images 301 and 302). In some cases, a feature-based image alignment technique can be performed by the image alignment engine 304. For example, the image alignment can be performed using feature detection and feature matching. Feature detection can be performed to detect local features in the large aperture image and the small aperture image. The local features can include any unique feature in the image, such as edges of a building and/or unique parts of the building, people or parts of people (e.g., eyes, mouth, bone structures, or the like).

The unique features can be referred to as keypoints or feature points, and can be detected using any suitable feature point detection technique. The feature point detection technique used by the image alignment engine 304 can identify points on the image that are stable under image transformations, such as translations (shifting), scaling (an increase or decrease in size), and rotations. In some cases, non-affine transformations, such as warping the image to compensate for lens distortion or other factors, may also be applied. For example, the image alignment engine 304 can find the (x, y) coordinates of the stable points. The feature point detection technique can then generate a descriptor defining the appearance of each identified points so the feature points can be distinguished from one another. In some cases, a feature descriptor can include an array of numbers or a vector. The same physical point in the small aperture image and the large aperture image should have the same feature descriptor.

Examples of feature point detection techniques include Scale Invariant Feature Transform (SIFT), Speed up Robust Feature (SURF), Oriented FAST and Rotated BRIEF (ORB), or other suitable keypoint detector. For example, using the SIFT technique, the image alignment engine 304 can first estimate a scale space extrema using the Difference of Gaussian (DoG), and can then perform a key point localization where the key point candidates are localized and refined by eliminating the low contrast points. A key point orientation assignment based on local image gradient can then be performed, followed by a descriptor generator for computing the local image descriptor for each key point based on image gradient magnitude and orientation.

In some cases, the SURF technique can be used. For example, SURF approximates the DoG with box filters. Rather than Gaussian averaging the image, squares are used for approximation due to the convolution with squares being faster if the integral image is used. The SURF technique can use a blob detector that is based on a Hessian matrix to find the points of interest. A blob can represent an object of interest in the image. For orientation assignment, wavelet responses can be used in both horizontal and vertical directions by applying Gaussian weights. Wavelet responses can also be sued for the feature descriptions. A neighborhood around a key point can be selected and divided into sub-regions. For each sub-region, the wavelet responses can be used to get a SURF-based feature descriptor. The sign of the Laplacian can be computed during the detection, and can be used for the underlying points of interest. The sign of the Laplacian distinguishes bright blobs on dark backgrounds from the reverse case. For feature matching, the features can be compared only if the features have a common sign (corresponding to a same type of contrast), providing faster matching.

As noted above, the same physical points (the feature points) in the small aperture image and the large aperture image should have the same feature descriptors. Because the small aperture image and the large aperture image are the same resolution, the large aperture and small aperture images can be aligned based on the feature points. For example, a pixel at an (x, y) location (300, 200) in the small aperture image, which can correspond to a building corner, can be aligned at the same location (300, 200) in the large aperture image.

Color matching can also be performed once the large aperture image and the small aperture image are aligned. For example, at block 406, the process 400 can perform color matching between the large aperture image and the small aperture image. The color matching can be performed by the color matching engine 306. In some cases, color matching can include a color balancing process to make sure a pixel in the large aperture image and a corresponding pixel in the small aperture image are roughly the same color. As used herein, corresponding pixels in the large aperture image and the small aperture image (and in the binary image mask) refer to pixels that are at a same location in the different images, as described in more detail below with respect to FIG. 12A and FIG. 12B. In some cases, the hue of one of the images (either the large aperture image or the small aperture image) can be adjusted to match the hue of the other image. In one example, if the small aperture image has more of a red hue than the large aperture image, the overall color of the pixels in the large aperture image can be adjusted to make it more red (e.g., by adding more red to the red (R) components of the pixels). In one example, if the small aperture image has more of a red hue than the large aperture image, the overall color of the pixels in the small aperture image can be adjusted to make it less red (e.g., by adding more blue to the blue (B) components of the pixels). In some cases, the colors of the corresponding pixels can be adjusted on a pixel-by-pixel bases, instead of for the entire image.

Figure 7:
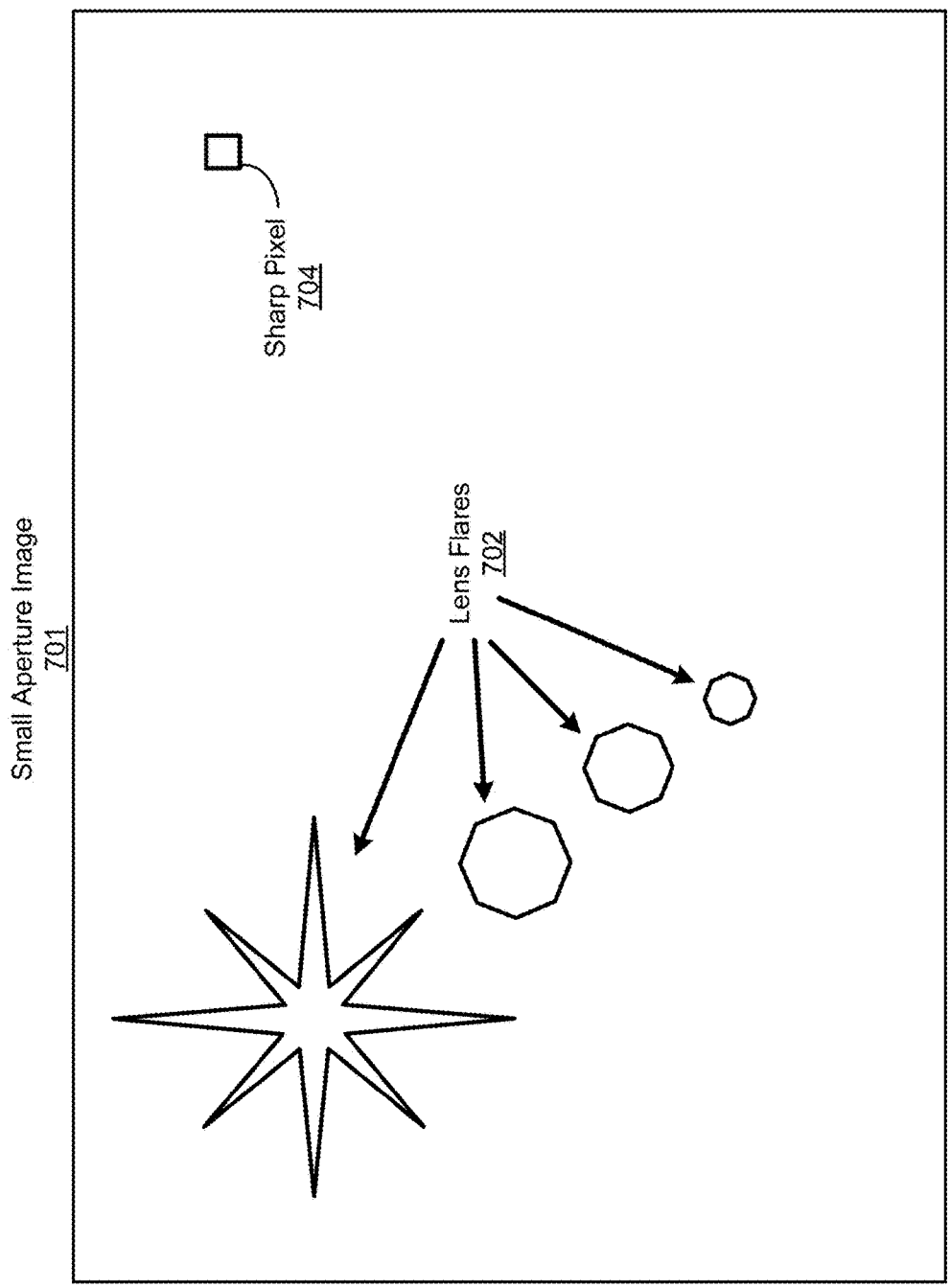
FIG. 7 is a diagram illustrating an example of a small aperture image that is captured using a small aperture and that has lens flare, in accordance with some examples.

At block 408, the process 400 can include detecting lens flare areas of the small aperture image. A pixel that is determined to belong to a lens flare area is referred to herein as a lens flare pixel. Based on the detected lens flare, the process 400 can generate a binary image mask at block 410. FIG. 7 is a diagram illustrating an example of a small aperture image 701 (e.g., first image) captured using a small aperture opening (e.g., an f-stop value of f/8). Due to the small aperture, the small aperture image 701 includes lens flares 702 and sharp pixels (e.g., sharp pixel 704) having a high degree of detail. The lens flare areas can be detected by the lens flare detection engine 308 using machine learning (e.g., deep learning based on a neural network) and/or using one or more image processing techniques. For example, a supervised machine learning process can be performed by training a neural network to detect lens flares in images. The neural network can include a deep learning neural network (also referred to as a deep network and a deep neural network). For instance, the lens flare detection engine 308 can apply a deep learning based detector to detect lens flare areas in small aperture images. A deep learning network can identify objects in an image based on knowledge gleaned from training images (or other data) that include similar objects and labels indicating the classification of those objects. For example, the deep learning network can detect or identify lens flare areas in a small aperture image based on past information about similar images with lens flare areas that the detector has learned using training data. The training data can include small aperture images with lens flare areas that are used to train the neural network. For instance, the neural network can be trained by inputting into the neural network many images that have lens flares and providing a known output for the input images. The input images can be annotated with an indication that certain areas in each image are lens flare areas. The known output of the neural network can include a binary image mask that includes a first value (e.g., a 1) for pixels that have lens flare and a second value (e.g., a 0) for pixels that do not have lens flare.

Any suitable type of deep learning network can be used, such as convolutional neural networks (CNNs), autoencoders, deep belief nets (DBNs), Recurrent Neural Networks (RNNs), among others. Further details of the structure and function of neural networks are described below with respect to FIG. 15 and FIG. 16. Examples of deep learning based detectors are described below with respect to FIG. 17A-FIG. 17C and FIG. 18A-FIG. 18C.

Once trained, the neural network implemented by the lens flare detection engine 308 can detect lens flare areas from small aperture images. The binary image mask engine 310 can then generate a binary image mask representing the small aperture images (e.g., with a value of 1 for the pixels in the lens flare areas and a value of 0 for the pixels in the image that are not part of the lens flare areas). In some examples, the neural network can output the binary image mask, in which case the lens flare detection engine 308 and the binary image mask engine 310 can be combined.

One or more image processing techniques can also be used to detect lens flare areas in a small aperture image. In one illustrative example, an object detection technique can be used to detect lens flares in a small aperture image. For instance, the object detection technique can convert the small aperture image to grayscale and can binarize the image using a range of thresholds, resulting in one or more binary images. Contour detection can then be performed for each binary image to define one or more blobs in the one or more images. The contours can be found using a border following method. The center of each blob can be computed, and blobs from the different binary images can be merged depending on their distance and similarity. A set of potential flare candidates can then be obtained from the blobs. The flare candidates can be filtered based on circularity of a blob, convexity of a blob, inertia of a blob, and area of a blob. A binary image mask can then be generated (e.g., by the binary image mask engine 310) using the blobs that are determined to be lens flares. Any other suitable image processing technique can be used to detect lens flares in the small aperture image.

Figure 8A:
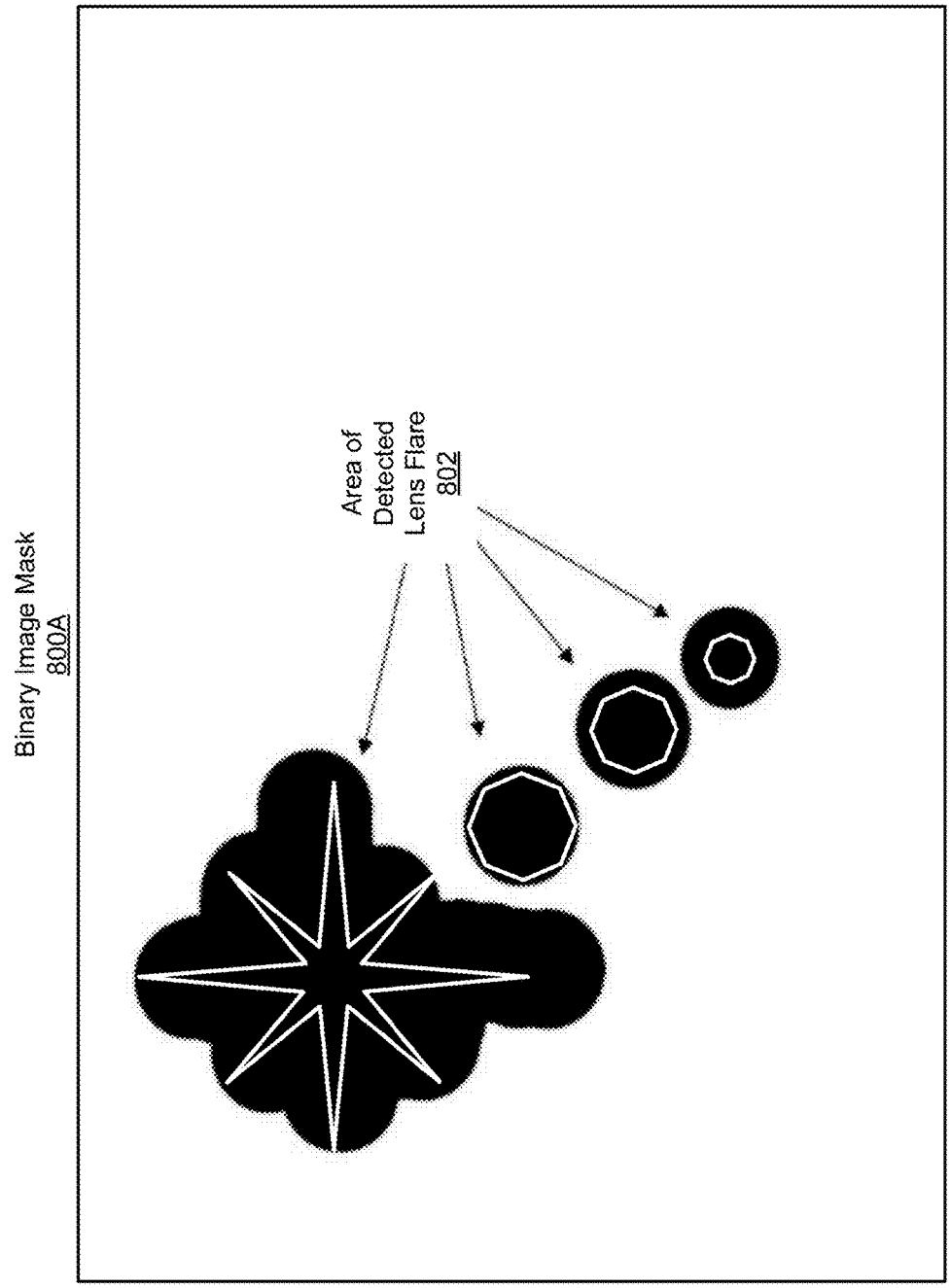
FIG. 8A is a diagram illustrating an example of a binary image mask generated using the small aperture image illustrated in FIG. 7, in accordance with some examples.

FIG. 8A is a diagram illustrating an example of a binary image mask 800A generated using the small aperture image 701 shown in FIG. 7. For illustration purpose, FIG. 8A shows the binary image mask 800A (in black color) superimposed with lens flare 702 (in white color) of FIG. 7. As shown, the area of detected lens flare 802 includes pixels that are designated as belonging to a lens flare area. Such pixels can have a binary pixel value of 1. The pixels outside of the area of detected lens flare 802 can include a binary value of 0. The binary image mask output from lens flare detection engine 308 can be the same size (resolution) as the small aperture image. In the event the lens flare detection engine 308 utilizes a neural network for detecting lens flare areas, the binary value determined for a pixel can be based on probability threshold. For example, the neural network can determine a probability that a pixel includes a lens flare pixel. The probability for that pixel can be compared to a probability threshold, which can be set to any suitable amount. In one illustrative example, the probability threshold can be set to 70%. If the probability determined for the pixel is greater than the probability threshold, the pixel can be determined to include a flare pixel (thus belonging to a lens flare area), and can be assigned a binary value of 1. If the probability determined for the pixel is less than the probability threshold, the pixel can be determined to not be part of a lens flare area, and can be assigned a binary value of 0.

The process 400 can then combine the large aperture image and the small aperture image at block 412 to generate an output image that has the lens flare removed and that retains sharp image details. For example, the image combining engine 312 of FIG. 3 can combine the small aperture image 301 and the large aperture image 303 to generate the final output image 313. The small aperture image and the large aperture image can be combined by replacing pixels from the lens flare areas of the small aperture image with the corresponding pixels from the large aperture image. The binary image mask generated from the small aperture image can be used to determine which pixels from the small aperture image to use for the output image and which pixels from the large aperture image to use for the output image.

Figure 8B:
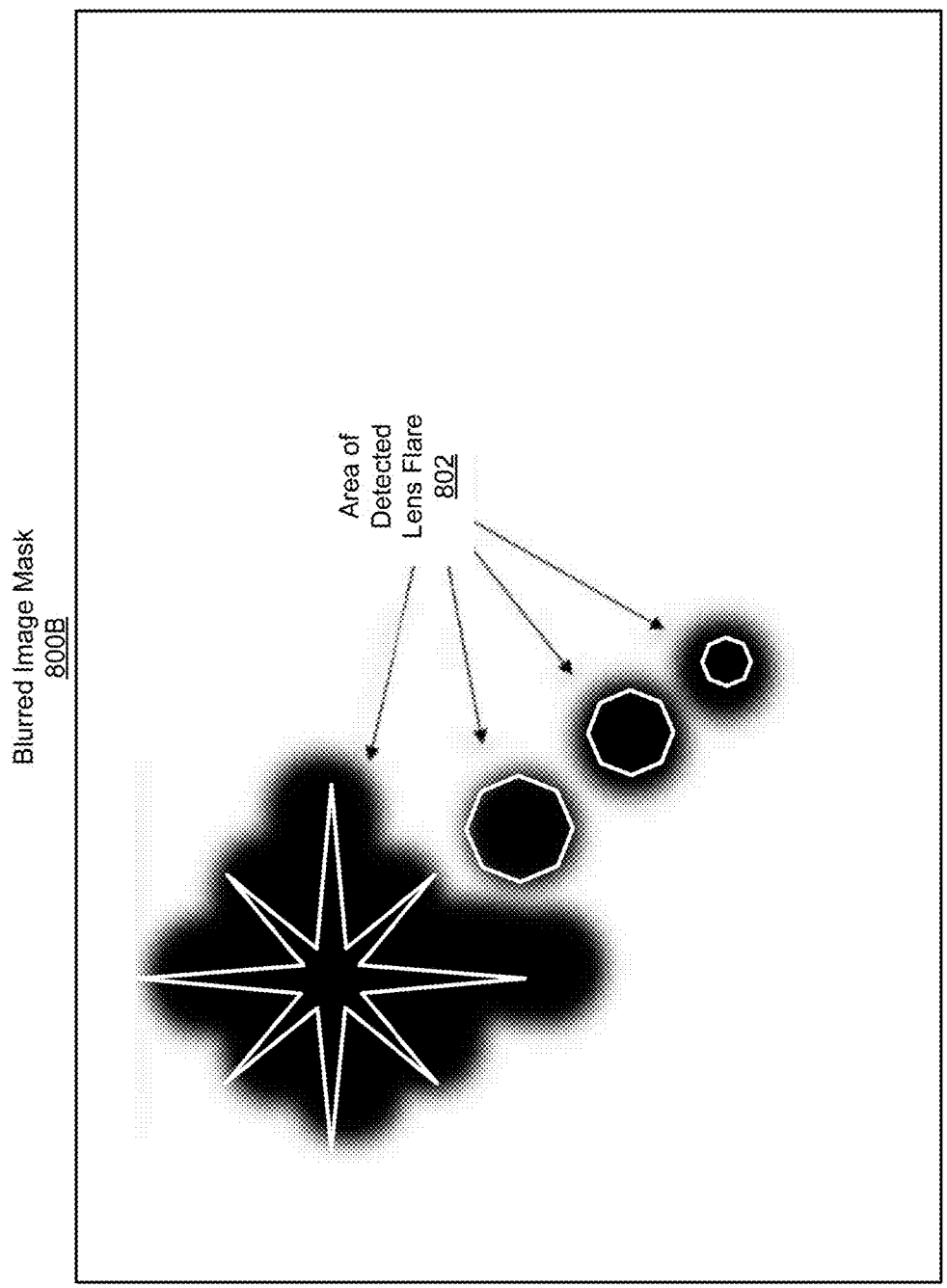
FIG. 8B is a diagram illustrating an example of an intermediate blurred image mask generated from the binary image mask shown in FIG. 8A, in accordance with some examples.
Figure 9:
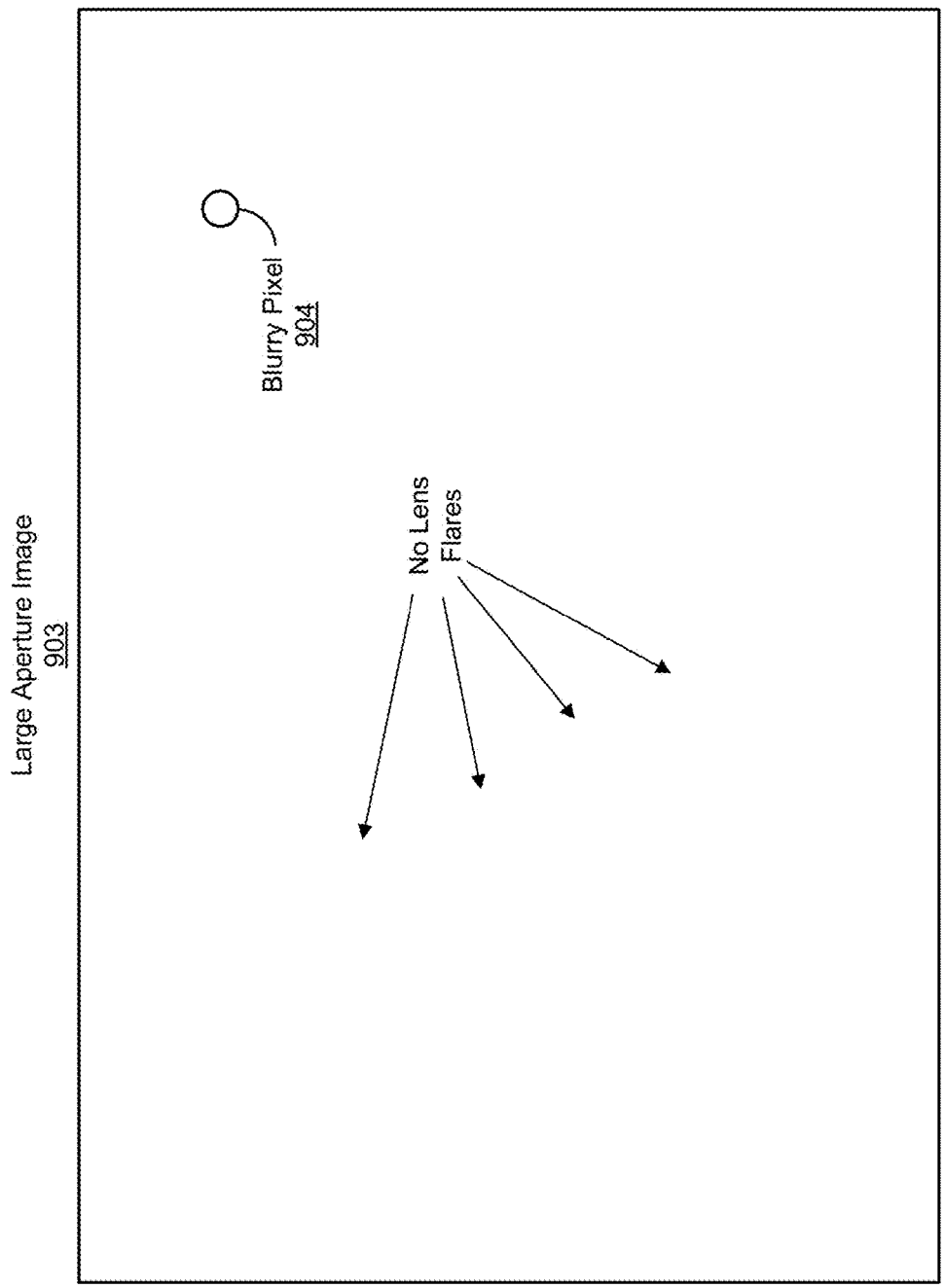
FIG. 9 is a diagram illustrating an example of a large aperture image that is captured using a large aperture and that does not have lens flare, in accordance with some examples.

Reference will be made to FIG. 7-FIG. 12D to describe an example of combining pixels of a small aperture image 701 (shown in FIG. 7, which can be a first image as described above) and pixels of a large aperture image 903 (shown in FIG. 9, which can be a second image as described above). As noted above, FIG. 7 illustrates a small aperture image 701 captured using a small aperture opening. The small aperture image 701 includes lens flares 702 due to less light striking the image sensor at the small aperture opening. The small aperture image 701 also includes sharp pixels (e.g., sharp pixel 704) based on the deep depth of field associated with a small aperture opening. FIG. 8A illustrates a binary image mask 800A generated using the small aperture image 701 shown in FIG. 7. FIG. 9 is a diagram illustrating an example of a large aperture image that is captured using a large aperture opening (e.g., using an f-stop setting of f/2.8 or at least a larger aperture opening than the aperture opening of small aperture image 701). There are no visible lens flares in the large aperture image 903 due to the large amount of light that is allowed to strike the image sensor through the large aperture opening. For example, the lens flares 702 that are present in the small aperture image 701 are blurred out in the large aperture image 903 due to the additional light hitting the image sensor through the large aperture opening. In addition, the pixels of the large aperture image 903 are blurry (e.g., blurry pixel 904) due to the shallow depth of field associated with the large aperture opening.

Figure 12A:
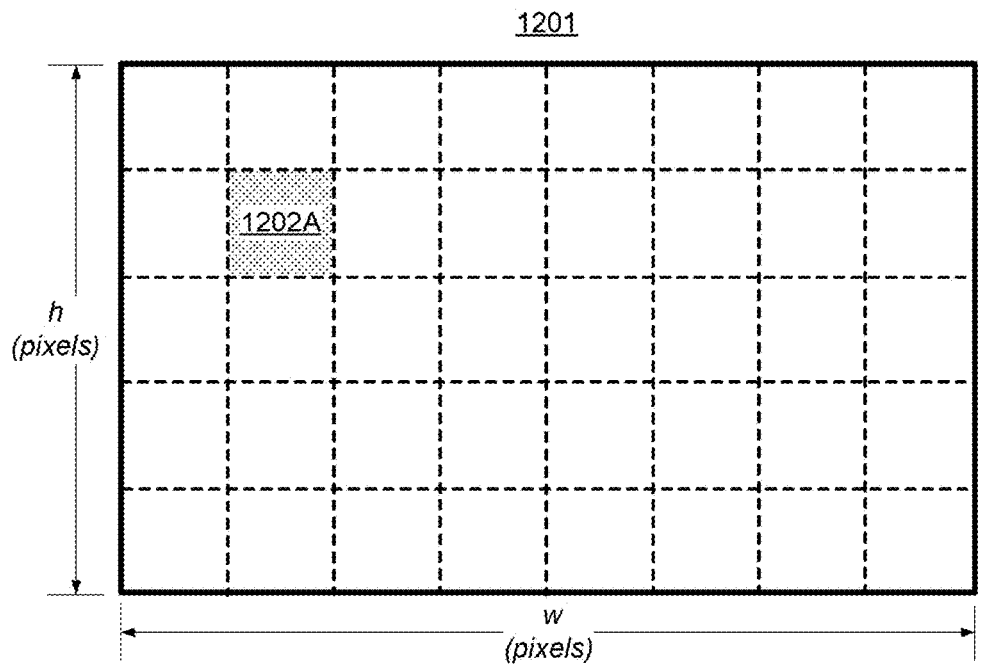
FIG. 12A is a diagram illustrating an example of pixel locations of the small aperture image illustrated in FIG. 7, in accordance with some examples.
Figure 12B:
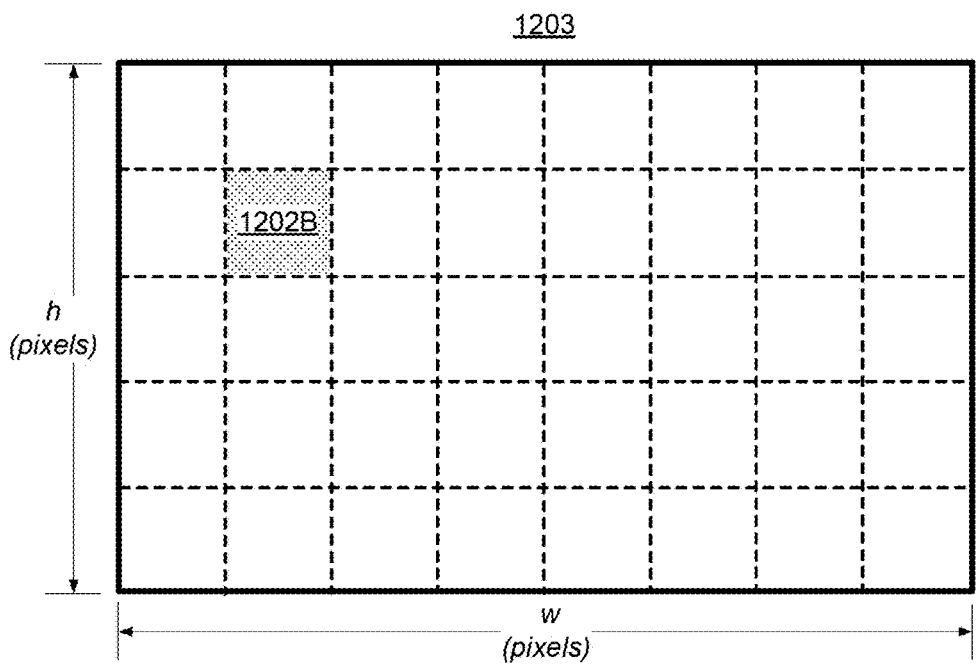
FIG. 12B is a diagram illustrating an example of pixel locations of the large aperture image illustrated in FIG. 9, in accordance with some examples.

Each pixel in the binary image mask 800A is associated with a corresponding pixel in the small aperture image 701 and is also associated with a corresponding pixel in the large aperture image 903. As noted above, corresponding pixels refer to pixels that are at a same location in the various images. FIG. 12A is a diagram illustrating an example of a grid 1201 of pixel locations of the small aperture image 701 (from FIG. 7). FIG. 12B is a diagram illustrating an example of a grid 1203 of pixel locations of the large aperture image 903 (from FIG. 9). As shown, the small aperture image 701 and the large aperture image 903 both include an array of w×h pixels (corresponding to width×height). The pixel at the pixel location 1202A in the grid 1201 of the small aperture image 701 is considered a corresponding pixel of the pixel at the pixel location 1202B in the grid 1203 of the large aperture image 903. The binary image mask 800A also includes a corresponding pixel at the same pixel location as the pixel locations 1202A and 1202B.

The image combining engine 312 can use pixels of the small aperture image 701 for the output image 313 if those pixels are not lens flare pixels. The pixels of the small aperture image 701 that are lens flare pixels can either be replaced in the output image 313 by the corresponding pixels of the large aperture image 903, or can be composited with the corresponding pixels of the large aperture image 903. The binary image mask 800A can be used by the image combining engine 312 to determine which pixels to use for the output image. For instance, if a pixel of the binary image mask 800A is not a lens flare pixel (e.g., the pixel has a value of 0), the corresponding pixel from the small aperture image 701 is used for that pixel of the output image. However, if a pixel of the binary image mask 800A is a lens flare pixel (e.g., the pixel has a value of 1), the corresponding pixel from the large aperture image 903 is either used for that pixel of the output image 313, or is composited with the corresponding pixel from the small aperture image 701.

Figure 10:
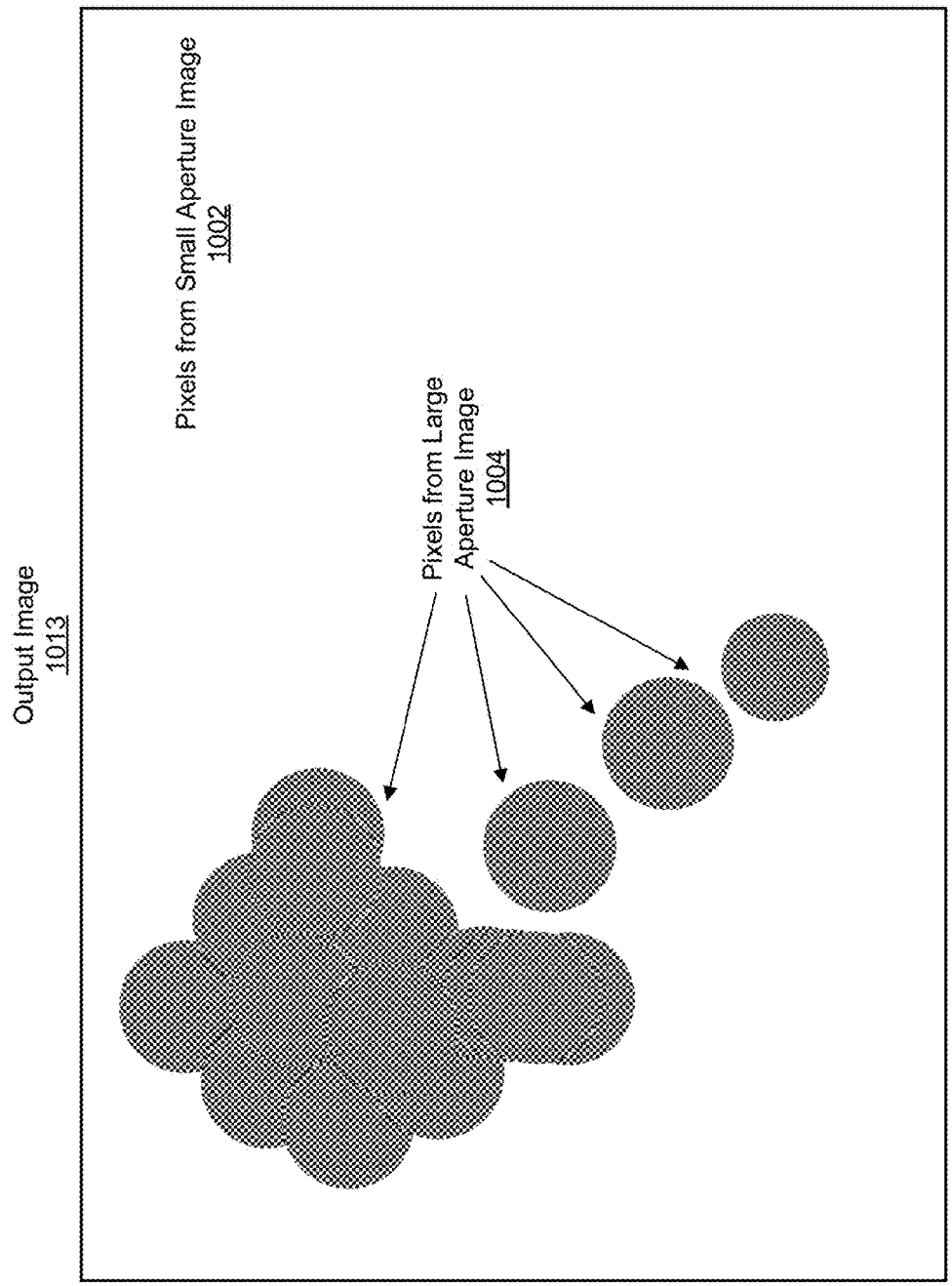
FIG. 10 is a diagram illustrating an example of an output image generated by combining the small aperture image (from FIG. 7) and the large aperture image (from FIG. 9), in accordance with some examples.

FIG. 10 is a diagram illustrating an example of an output image 1013 generated by using pixels 1002 from the small aperture image 701 and pixels 1004 from the large aperture image 903. The pixels 1002 from the small aperture image 701 are selected for use in the output image 1013 based on the binary image mask 800A indicating those pixels as not being part of the area of detected lens flare 802. For example, the pixels from the binary image mask 800A that correspond to the pixels 1002 from the small aperture image 701 can have a binary value of 0 in the binary image mask 800A. The pixels 1004 from the large aperture image 903 are selected for use in the output image 1013 based on the binary image mask 800A indicating the corresponding pixels from the small aperture image 701 as being part of the area of detected lens flare 802. For example, the pixels from the binary image mask 800A that correspond to the pixels 1004 from the large aperture image 903 can have a binary value of 1 in the binary image mask 800A. Accordingly, the output image 1013 includes the sharp pixels from the small aperture image 701 that do not include lens flare, and also includes the pixels from the large aperture image 903 that correspond to the lens flare areas, resulting in the output image 1013 not including any lens flare or including minimal lens flare.

Figure 11:
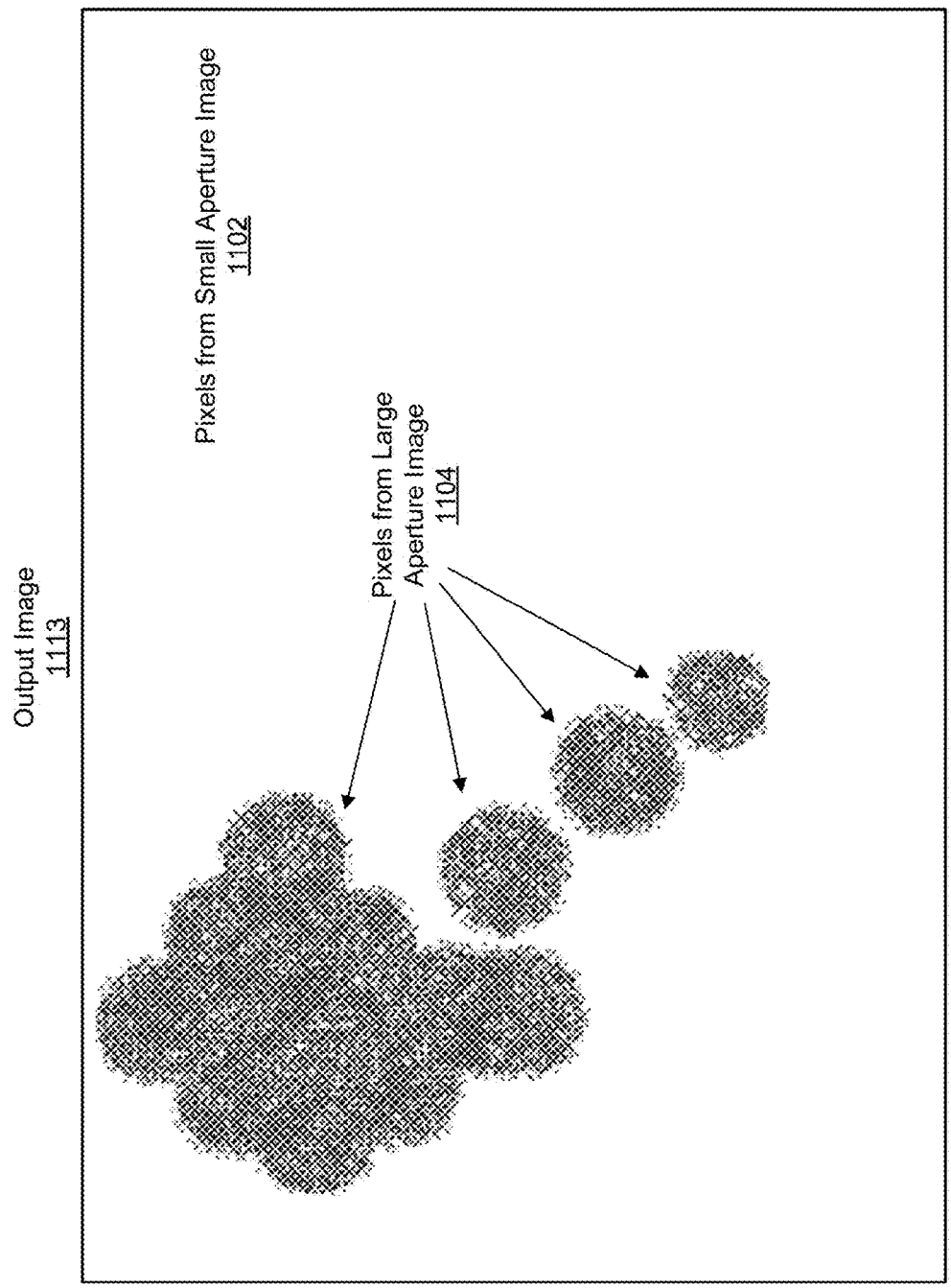
FIG. 11 is a diagram illustrating another example of an output image generated by combining the small aperture image (from FIG. 7) and the large aperture image (from FIG. 9), in accordance with some examples.

In some cases, the pixels of the small aperture image 701 that are lens flare pixels can be composited with the corresponding pixels of the large aperture image 903. FIG. 11 is a diagram illustrating an example of an output image 1113 generated by using pixels from the small aperture image 701, pixels from the large aperture image 903, and a composite of pixels from the small aperture image 701 and the large aperture image 903. Whether a value for a pixel in the output image 1113 includes the actual pixel value from the small aperture image 701, the actual pixel value from the large aperture image 903, or a composite value can be based on a blend matte value determined for the corresponding pixel in the binary image mask 800A. Details of how a blend matte value can be determined for a particular pixel of the binary image mask 800A are described below with respect to FIG. 12C and FIG. 12D. The blend matte value can be determined by the binary image mask engine 310 or the image combining engine 312. In some cases, the blend matte values can be added to a blurred image mask, as described below with respect to FIG. 8B.

The blend matte value determined for a pixel in the binary image mask 800A indicates a percentage of the corresponding pixel from the large aperture image 903 to use for the lens flare area of the output image 1113. For example, if a pixel in the binary image mask 800A has a blend matte value of 0, 0% of the pixel value from the large aperture image 903 is used for the corresponding pixel of the output image 1113, in which case 100% of the pixel value from the small aperture image 701 will be used for the pixel of the output image 1113. Accordingly, the pixels 1102 from the small aperture image 701 are selected for use in the output image 1113 when the binary image mask 800A has a blend matte value of 0 for those pixels. As indicated below in the discussion of FIG. 12C and FIG. 12D, the pixels in the binary image mask 800A assigned a blend matte value of 0 are not part of or are not close to the area of detected lens flare 802 shown in FIG. 8A.

The pixels 1104 in the output image 1100 that are from the large aperture image 903 can include actual pixel values from the large aperture image 903 and can also include values that are composites of the pixel values from the large aperture image 903 and the pixel values from the small aperture image 701. The actual value of a pixel from the large aperture image 903 can be selected for use in the output image 1113 when the corresponding pixel in the binary image mask 800A has a blend matte value of 1 (corresponding to 100%). For example, if a pixel in the binary image mask 800A has a blend matte value of 1, 100% of the pixel value from the large aperture image 903 is used for the corresponding pixel of the output image 1113, in which case 0% of the pixel value from the small aperture image 701 will be used. As indicated below in the discussion of FIG. 12C and FIG. 12D, the pixels in the binary image mask 800A assigned a blend matte value of 1 are within (not on the edges of) the area of detected lens flare 802 shown in FIG. 8A.

Pixels at the edges of the area of detected lens flare 802 (shown as blurred pixels in FIG. 11) can have a blend matte value between 0 and 1, as described below with respect to FIG. 12C and FIG. 12D. A composite of the pixel value from the small aperture image 701 and the corresponding pixel value from the large aperture image 903 is used for the output image 1113 when the blend matte value for the corresponding pixel in the binary image mask 800A has a value between 0 and 1. In one illustrative example, if a pixel in the mask 800A has a blend matte value of 0.5, 50% of the pixel value from the large aperture image can be combined with 50% of the pixel value from the small aperture image (e.g., using A over B compositing). The pixel values can be combined on a per-color-component basis. The pixels can include any type of color components, such as red, green, blue (RGB) or luma, chroma-blue, and chroma-red (YCbCr). For example, the red (R) pixel values of the two images can be composited, the green (G) pixel values of the two images can be composited, and the blue (B) pixel values of the two images can be composited.

The blend matte value for a pixel in the binary image mask 800A can be determined using an initial value of the pixel of the binary image mask 800A and also using values of a plurality of pixels neighboring the pixel of the binary image mask 800A. Different types of blur sampling techniques (referred to as blur Kernels) can be used to determine the blend matte values. FIG. 12C is a diagram illustrating an example of a group of neighboring pixel locations around the pixel location 1202C of the binary image mask 800A. The pixel location 1202C in the binary image mask 800A corresponds to the pixel location 1202A from FIG. 12A and the pixel location 1202B from FIG. 12B. The neighboring pixels include a top-left neighbor (N1), a top neighbor (N2), a top-right neighbor (N3), a left neighbor (N4), a right neighbor (N5), a bottom-left neighbor (N6), a bottom neighbor (N7), and a bottom-right neighbor (N8). One of ordinary skill will appreciate that any number of neighboring pixels can be used to determine the blend matte value for the pixel at pixel location 1202C in the binary image mask 800A. For example, instead of eight neighboring pixels, twenty-four neighboring pixels (including the neighboring pixels N1-N8 and all the pixels neighboring the pixels N1-N8) could be used to determine the blend matte value for the pixel at pixel location 1202C.

FIG. 12D is a diagram illustrating an example of an initial binary value assigned to the pixel at the pixel location 1202C of the binary image mask 800A, and the initial binary values assigned to the group of neighboring pixels N1-N8. As shown, the pixel at location 1202C has an initial binary value of 1, indicating that the pixel is a lens flare pixel. The N2, N3, N5, N7, and N8 pixels also have binary values of 1 (and thus include lens flare pixels), while the N1, N4, and N6 pixels have a value of 0 (and thus are not lens flare pixels). The mixture of 0 and 1 values for the neighboring pixel values around the pixel at location 1202C can be due to the pixel being at an edge of a lens flare area. As noted above, different types of blur sampling techniques (blur Kernels) can be used to determine the blend matte values. One type of blur Kernel is a box blur Kernel, where the blend matte value for the pixel at location 1202C can be determined by averaging the initial value of the pixel (the value of 1) and the values of the neighboring pixels, resulting in a blend matte value of 0.67 for the pixel. Using the box blur Kernel, the neighboring pixels are assigned equal weights. Another blur Kernel for determining the blend matte values is a Gaussian Blur, where the weights per pixel are not the same. Using a Gaussian Blur Kernel, the weights are assigned according to a Gaussian matrix, which is more like a bell curve than the flat box used in the box blur. Another blur Kernel for determining the blend matte values is a Triangle Filter (or Kernel), which can distribute weight for the neighboring pixels.

The new blend matte values can be used to generate a blurred image mask, which is a separate intermediate blurred matte generated by processing the binary image mask 800A that can be used to determine the pixel values from the small aperture image 701 and the pixel values from the large aperture image 903 to use for the final output image 1113. FIG. 8B is a diagram illustrating an example of an intermediate blurred image mask 800B generated from the binary image mask 800A shown in FIG. 8A. For illustration purpose, FIG. 8B shows the intermediate blurred image mask 800B (in black color) superimposed with lens flare 702 (in white color) of FIG. 7. The blend matte values of the blurred image mask 800B can be used to determine an amount of the pixel values from the small aperture image 701 and the large aperture image 903 to use for the output image 1113. For example, the blend matte values from the blurred image mask 800B can be used as the $\alpha_a$ values in the A over B compositing described below. The use of a separate intermediate blurred image mask is optional, and in some cases, the binary image mask 800A can be used to determine the pixels for an output image.

Using the blend matte value of 0.67 in the blurred image mask 800B for the pixel at location 1202C, 67% of the corresponding pixel from the large aperture image 903 will be composited with 33% of the corresponding pixel from the small aperture image 701 using a compositing operation. For example, an A over B compositing operation can be used for compositing the pixel from an image A (e.g., the large aperture image 903) with the corresponding pixel from an image B (e.g., the small aperture image 701). An example equation for an A over B compositing operation can be expressed as:

$$C_0 = \frac{C_a \alpha_a + C_b \alpha_b (1 - \alpha_a)}{\alpha_a + \alpha_b (1 - \alpha_a)} \quad \text{(Equation 1)}$$

In Equation 1, $C_0$ is the result of the A over B compositing operation, $C_a$ is the color of the pixel in image A, $C_b$ is the color of the corresponding pixel in image B, and $\alpha_a$ and $\alpha_b$, are the alpha of the pixels in images A and B respectively. Continuing with the example from above, the result ($C_0$) can be the final value for a color component (e.g., a red, green, or blue color component) of the pixel at the location in the output image 1113 that corresponds to the pixel at the pixel location 1202C in the binary image mask 800A. $C_a$ can be the actual value of the color component of the corresponding pixel in image A (e.g., large aperture image 903). $C_b$ can be the actual value of the color component of the corresponding pixel in image B (e.g., small aperture image 701). $\alpha_a$ can be the blend matte value determined for the pixel at the pixel location 1202C in the blurred image mask 800A (corresponding to the percentage of the pixel from the large aperture image 903 (image A) to use for the output image 1113) and after the pixel has been processed by one of the blur sampling techniques described above, and $\alpha_b$ can be equal to $1-\alpha_a$ (corresponding to the percentage of the pixel from the small aperture image 701 (image B) to use for the output image 1113). The blend matte value of $\alpha_a$ can define how much of the pixel value from the large aperture image (image A) will end up on top of the corresponding pixel in the small aperture image (image B).

Using the above-described lens flare removal techniques, a final output image (e.g., output image 1013 or output image 1113) can be obtained that includes sharp details without any visible lens flare. As described above, the sharp pixels from the small aperture image can be combined with the pixels from a large aperture image (that have the lens flare areas blurred out) to generate the output image.

In some examples, the lens flare removal system 302 can use the areas of a lens flare to reset the focus of the camera when capturing the large aperture image. The focus can be reset by setting the camera focus point to be focused (e.g., centered or near-centered) on the lens flare area detected in a small aperture image. The large aperture image can then be captured using the new focus point.

Figure 13:
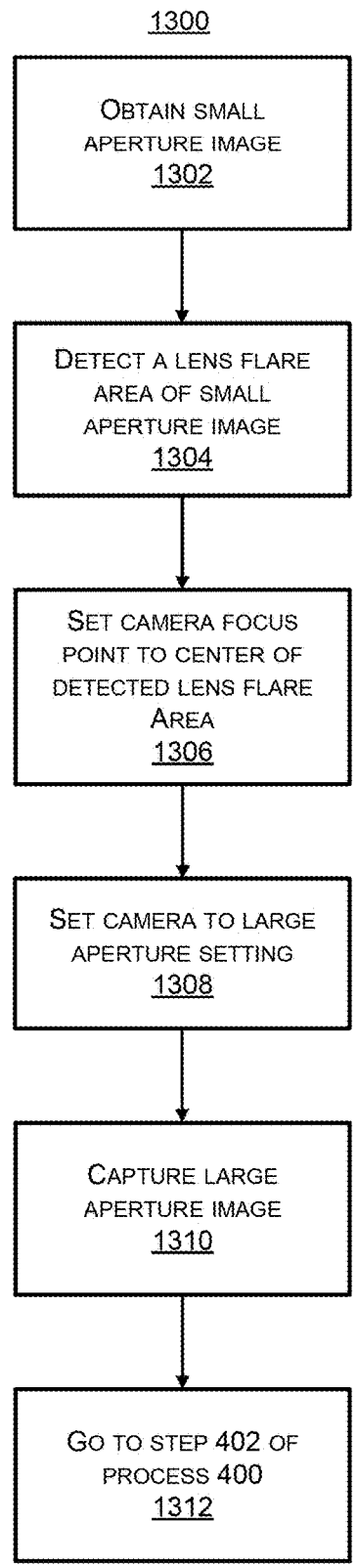
FIG. 13 is a flowchart illustrating an example of a process for resetting the focus of a camera for performing lens flare removal, in accordance with some examples.

FIG. 13 is a flowchart illustrating an example of a process 1300 for resetting the focus of a camera for performing lens flare removal. At block 1302, the process 1300 can obtain the small aperture image. For example, the small aperture image can be captured by a camera, or can be obtained from another image source. At block 1304, the process 1300 can detect a lens flare area of the small aperture image. The lens flare area can be detected using any of the techniques described herein, such as using machine learning, image processing, a combination of image processing and machine learning, or using any other suitable technique.

At block 1306, the process 1300 can reset the focus point of the camera used to capture the small aperture image to a center of the detected lens flare area. In some cases, the focus point can be reset to another point of the detected lens flare area other than the center. The process 1300 can then set the camera to the large aperture setting at block 1308, and can capture the large aperture image at block 1310. Once the large aperture image is captured at block 1310, the process 1300 can (at block 1312) proceed to block 402 of the process 400 shown in FIG. 4. Resetting the focus point of the camera can help improve the sharpness of the pixels in the lens flare area of the large aperture image. In such examples, the pixels from the large aperture image in the lens flare areas that are used in the output image are sharper and less blurry.

Figure 14:
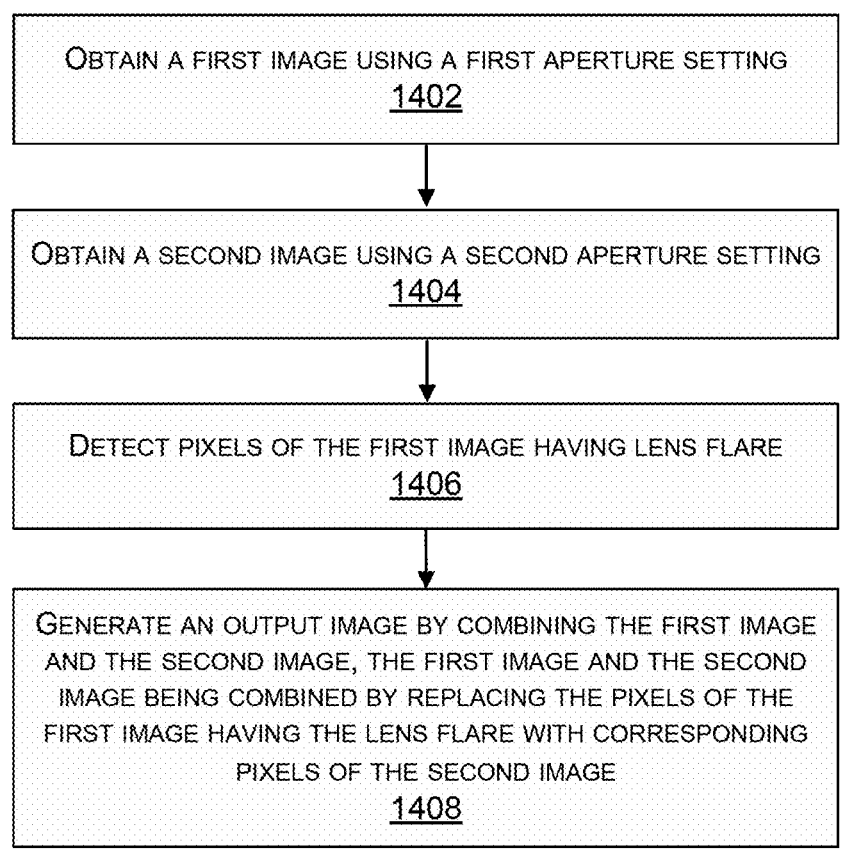
FIG. 14 is a flowchart illustrating an example of a process of processing a plurality of images, in accordance with some embodiments.

FIG. 14 is a flowchart illustrating an example of a process 1400 for processing a plurality of images using the lens flare removal techniques described herein. At block 1402, the process 1400 includes obtaining a first image using a first aperture setting. At block 1404, the process 1400 includes obtaining a second image using a second aperture setting.

In some examples, The first image can be a small aperture image, such as small aperture images 301 and 701, whereas the second image can be a large aperture image, such as large aperture images 303 and 903, with the first aperture setting being associated with a smaller aperture size than an aperture size associated with the second aperture setting. In some examples, the first image and the second image can be captured by two cameras of a dual camera system. In some examples, the first image and the second image can be captured by a single camera system. The first and second images can be captured at a same exposure time by, for example, adjusting a shutter speed of at least one camera.

At block 1406, the process 1400 includes detecting pixels of the first image having lens flare. The lens flare can be detected using any of the techniques described herein, such as using machine learning, image processing, a combination of image processing and machine learning, or using any other suitable technique. In some examples, at block 1404 the process 1400 may optionally include aligning the first image and the second image, color matching the aligned first image and the second image, and detecting the pixels of the first image having the lens flare after the first image and the second image are color matched.

At block 1408, the process 1400 includes generating an output image by combining the first image and the second image, the first image and the second image being combined by replacing the pixels of the first image having the lens flare with corresponding pixels of the second image. In some examples, at block 1408 the process 1400 may optionally include generating a binary image mask based on pixels of the first image, the binary image mask including a first value for the pixels of the first image that have the lens flare and a second value for pixels in the first image that do not have the lens flare, and combining the first image and the second image using the binary image mask.

In some examples, combining the first image and the second image using the binary image mask in block 1408 includes using one or more of a value of a pixel of the first image or a value of a corresponding pixel of the second image for a corresponding pixel of the output image based on a value determined for a corresponding pixel of the binary image mask. The pixel of the first image may have a same location as a location of the corresponding pixel of the second image and a location of the corresponding pixel of the binary image mask.

There are different ways to determine the value for a corresponding pixel of the binary image mask. In some examples, the values determined for the corresponding pixel of the binary image mask includes the first value for the pixels of the first image or the second value for pixels in the first image that do not have the lens flare included in the binary image mask. In some examples, the value determined for the corresponding pixel of the binary image mask indicates a percentage of the corresponding pixel of the second image to use for the corresponding pixel of the output image, wherein the corresponding pixel of the output image has a same location as the location of the corresponding pixel of the second image. In some examples, the value for the corresponding pixel of the binary image mask can be determined using an initial value of the corresponding pixel of the binary image mask and values of a plurality of pixels neighboring the corresponding pixel of the binary image mask. In some examples, the value for the corresponding pixel of the binary image mask is determined by averaging the initial value of the corresponding pixel of the binary image mask and the values of the plurality of pixels neighboring the corresponding pixel of the binary image mask. In some examples, the value for the corresponding pixel of the binary image mask is included in a blurred image mask.

In some examples, the process 1400 may be performed by a computing device or an apparatus, which can include the lens flare removal system 302 shown in FIG. 3. In some cases, the computing device or apparatus may include a processor, microprocessor, microcomputer, or other component of a device that is configured to carry out the steps of process 1400. In some examples, the computing device or apparatus may include a camera configured to capture images and/or video data (e.g., a video sequence) including video frames. For example, the computing device may include a mobile device with a camera (e.g., a digital camera, an IP camera, a mobile phone or tablet including a camera, or other type of device with a camera). In some cases, the computing device may include a display for displaying the output images. In some cases, the computing device may include a video codec. In some examples, a camera or other capture device that captures the images and/or video data is separate from the computing device, in which case the computing device receives the captured video data. The computing device may further include a network interface configured to communicate the video data. The network interface may be configured to communicate Internet Protocol (IP) based data or other suitable network data.

Process 1400 is illustrated as logical flow diagrams, the operation of which represent a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the process 1400 may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

As described above, neural network-based detectors can be used by the lens flare detection engine 308 to detect lens flares in the small aperture images. Illustrative examples of deep neural networks that can be used include a convolutional neural network (CNN), an autoencoder, a deep belief net (DBN), a Recurrent Neural Networks (RNN), or any other suitable neural network. In one illustrative example, a deep neural network based detector applied by the lens flare detection engine 308 can include a deep network based detector, such as a single-shot detector (SSD) (as described below with respect to FIGS. 17A-FIG. 17C), a YOLO detector (as described below with respect to FIGS. 18A-FIG. 18C), or other suitable detector that operates using a neural network.

Figure 15:
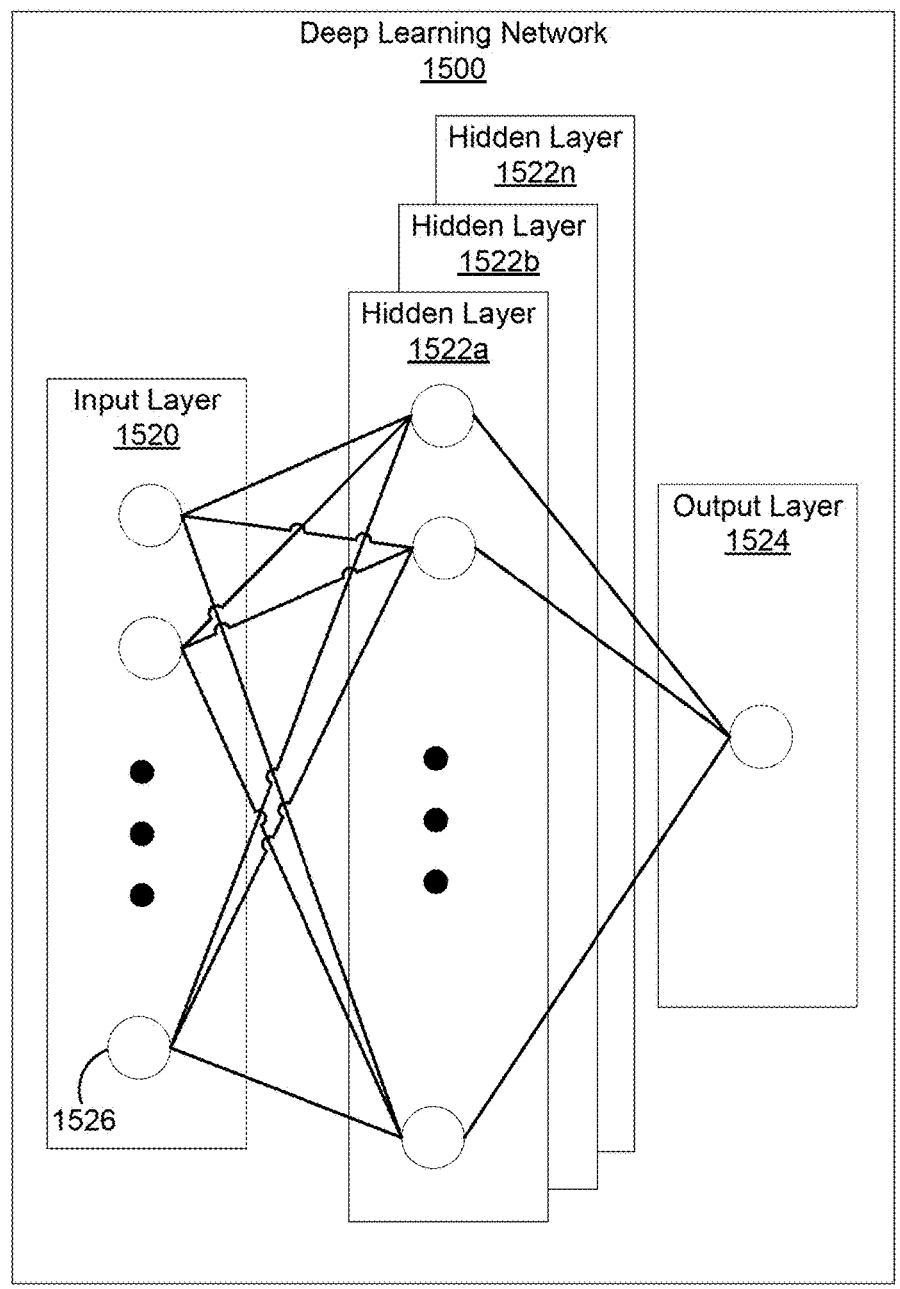
FIG. 15 is a block diagram illustrating an example of a deep learning network, in accordance with some examples.

FIG. 15 is an illustrative example of a deep learning neural network 1500 that can be used by the lens flare detection engine 308. An input layer 1520 includes input data. In one illustrative example, the input layer 1520 can include data representing the pixels of an input video frame. The deep learning network 1500 includes multiple hidden layers 1522a, 1522b, through 1522n. The hidden layers 1522a, 1522b, through 1522n include "n" number of hidden layers, where "n" is an integer greater than or equal to one. The number of hidden layers can be made to include as many layers as needed for the given application. The deep learning network 1500 further includes an output layer 1524 that provides an output resulting from the processing performed by the hidden layers 1522a, 1522b, through 1522n. In one illustrative example, the output layer 1524 can provide a classification and/or a localization for an object in an input video frame. The classification can include a class identifying the type of object (e.g., a person, a dog, a cat, or other object) and the localization can include a bounding box indicating the location of the object.

The deep learning network 1500 is a multi-layer neural network of interconnected nodes. Each node can represent a piece of information. Information associated with the nodes is shared among the different layers and each layer retains information as information is processed. In some cases, the deep learning network 1500 can include a feed-forward network, in which case there are no feedback connections where outputs of the network are fed back into itself. In some cases, the network 1500 can include a recurrent neural network, which can have loops that allow information to be carried across nodes while reading in input.

Information can be exchanged between nodes through node-to-node interconnections between the various layers.

Nodes of the input layer 1520 can activate a set of nodes in the first hidden layer 1522a. For example, as shown, each of the input nodes of the input layer 1520 is connected to each of the nodes of the first hidden layer 1522a. The nodes of the hidden layers 1522a-n can transform the information of each input node by applying activation functions to these information. The information derived from the transformation can then be passed to and can activate the nodes of the next hidden layer 1522b, which can perform their own designated functions. Example functions include convolutional, up-sampling, data transformation, and/or any other suitable functions. The output of the hidden layer 1522b can then activate nodes of the next hidden layer, and so on. The output of the last hidden layer 1522n can activate one or more nodes of the output layer 1524, at which an output is provided. In some cases, while nodes (e.g., node 1526) in the deep learning network 1500 are shown as having multiple output lines, a node has a single output and all lines shown as being output from a node represent the same output value.

In some cases, each node or interconnection between nodes can have a weight that is a set of parameters derived from the training of the deep learning network 1500. For example, an interconnection between nodes can represent a piece of information learned about the interconnected nodes. The interconnection can have a tunable numeric weight that can be tuned (e.g., based on a training dataset), allowing the deep learning network 1500 to be adaptive to inputs and able to learn as more and more data is processed.

The deep learning network 1500 is pre-trained to process the features from the data in the input layer 1520 using the different hidden layers 1522a, 1522b, through 1522n in order to provide the output through the output layer 1524. In an example in which the deep learning network 1500 is used to identify objects in images, the network 1500 can be trained using training data that includes both images and labels. For instance, training images can be input into the network, with each training image having a label indicating the classes of the one or more objects in each image (basically, indicating to the network what the objects are and what features they have). In one illustrative example, a training image can include an image of a number 2, in which case the label for the image can be [0 0 1 0 0 0 0 0 0 0].

In some cases, the deep neural network 1500 can adjust the weights of the nodes using a training process called backpropagation. Backpropagation can include a forward pass, a loss function, a backward pass, and a weight update. The forward pass, loss function, backward pass, and parameter update is performed for one training iteration. The process can be repeated for a certain number of iterations for each set of training images until the network 1500 is trained well enough so that the weights of the layers are accurately tuned.

For the example of identifying objects in images, the forward pass can include passing a training image through the network 1500. The weights are initially randomized before the deep neural network 1500 is trained. The image can include, for example, an array of numbers representing the pixels of the image. Each number in the array can include a value from 0 to 255 describing the pixel intensity at that position in the array. In one example, the array can include a 28×28×3 array of numbers with 28 rows and 28 columns of pixels and 3 color components (such as red, green, and blue, or luma and two chroma components, or the like).

For a first training iteration for the network 1500, the output will likely include values that do not give preference to any particular class due to the weights being randomly selected at initialization. For example, if the output is a vector with probabilities that the object includes different classes, the probability value for each of the different classes may be equal or at least very similar (e.g., for ten possible classes, each class may have a probability value of 0.1). With the initial weights, the network 1500 is unable to determine low level features and thus cannot make an accurate determination of what the classification of the object might be. A loss function can be used to analyze error in the output. Any suitable loss function definition can be used. One example of a loss function includes a mean squared error (MSE). The MSE is defined as $$E_{total} = \sum \frac{1}{2}(\text{target} - \text{output})^2,$$

which calculates the sum of one-half times the actual answer minus the predicted (output) answer squared. The loss can be set to be equal to the value of $E_{total}$.

The loss (or error) will be high for the first training images since the actual values will be much different than the predicted output. The goal of training is to minimize the amount of loss so that the predicted output is the same as the training label. The deep learning network 1500 can perform a backward pass by determining which inputs (weights) most contributed to the loss of the network, and can adjust the weights so that the loss decreases and is eventually minimized.

A derivative of the loss with respect to the weights (denoted as dL/dW, where W are the weights at a particular layer) can be computed to determine the weights that contributed most to the loss of the network. After the derivative is computed, a weight update can be performed by updating all the weights of the filters. For example, the weights can be updated so that they change in the opposite direction of the gradient. The weight update can be denoted as $$w = w_i - \eta \frac{dL}{dW},$$

where w denotes a weight, $w_i$ denotes the initial weight, and η denotes a learning rate. The learning rate can be set to any suitable value, with a high learning rate including larger weight updates and a lower value indicating smaller weight updates.

The deep learning network 1500 can include any suitable deep network. One example includes a convolutional neural network (CNN), which includes an input layer and an output layer, with multiple hidden layers between the input and out layers. The hidden layers of a CNN include a series of convolutional, nonlinear, pooling (for downsampling), and fully connected layers. The deep learning network 1500 can include any other deep network other than a CNN, such as an autoencoder, a deep belief nets (DBNs), a Recurrent Neural Networks (RNNs), among others.

Figure 16:
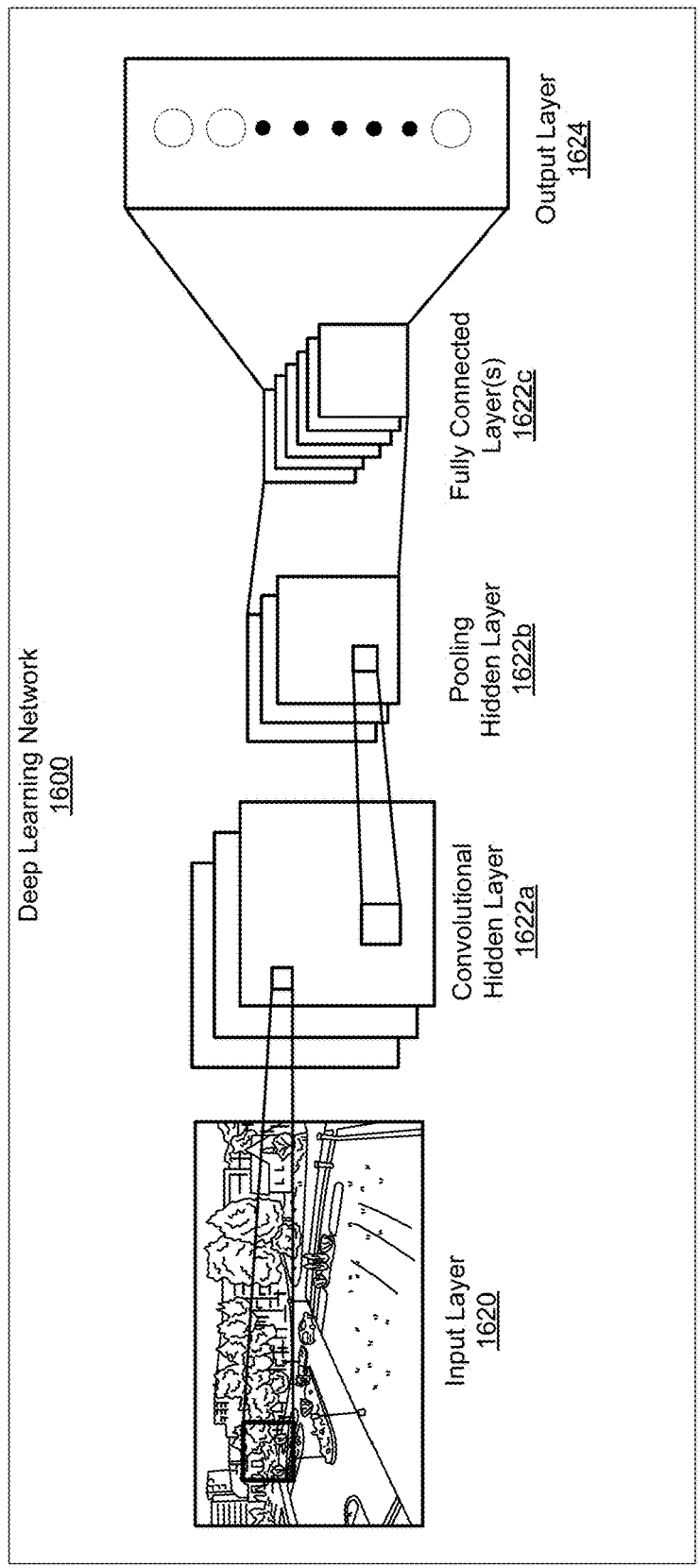
FIG. 16 is a block diagram illustrating an example of a convolutional neural network, in accordance with some examples.

FIG. 16 is an illustrative example of a convolutional neural network 1600 (CNN 1600). The input layer 1620 of the CNN 1600 includes data representing an image. For example, the data can include an array of numbers representing the pixels of the image, with each number in the array including a value from 0 to 255 describing the pixel intensity at that position in the array. Using the previous example from above, the array can include a 28×28×3 array of numbers with 28 rows and 28 columns of pixels and 3 color components (e.g., red, green, and blue, or luma and two chroma components, or the like). The image can be passed through a convolutional hidden layer 1622a, an optional non-linear activation layer, a pooling hidden layer 1622b, and fully connected hidden layers 1622c to get an output at the output layer 1624. While only one of each hidden layer is shown in FIG. 16, one of ordinary skill will appreciate that multiple convolutional hidden layers, non-linear layers, pooling hidden layers, and/or fully connected layers can be included in the CNN 1600. As previously described, the output can indicate a single class of an object or can include a probability of classes that best describe the object in the image.

The first layer of the CNN 1600 is the convolutional hidden layer 1622a. The convolutional hidden layer 1622a analyzes the image data of the input layer 1620. Each node of the convolutional hidden layer 1622a is connected to a region of nodes (pixels) of the input image called a receptive field. The convolutional hidden layer 1622a can be considered as one or more filters (each filter corresponding to a different activation or feature map), with each convolutional iteration of a filter being a node or neuron of the convolutional hidden layer 1622a. For example, the region of the input image that a filter covers at each convolutional iteration would be the receptive field for the filter. In one illustrative example, if the input image includes a 28×28 array, and each filter (and corresponding receptive field) is a 5×5 array, then there will be 24×24 nodes in the convolutional hidden layer 1622a. Each connection between a node and a receptive field for that node learns a weight and, in some cases, an overall bias such that each node learns to analyze its particular local receptive field in the input image. Each node of the hidden layer 1622a will have the same weights and bias (called a shared weight and a shared bias). For example, the filter has an array of weights (numbers) and the same depth as the input. A filter will have a depth of 3 for the video frame example (according to three color components of the input image). An illustrative example size of the filter array is 5×5×3, corresponding to a size of the receptive field of a node.

The convolutional nature of the convolutional hidden layer 1622a is due to each node of the convolutional layer being applied to its corresponding receptive field. For example, a filter of the convolutional hidden layer 1622a can begin in the top-left corner of the input image array and can convolve around the input image. As noted above, each convolutional iteration of the filter can be considered a node or neuron of the convolutional hidden layer 1622a. At each convolutional iteration, the values of the filter are multiplied with a corresponding number of the original pixel values of the image (e.g., the 5×5 filter array is multiped by a 5×5 array of input pixel values at the top-left corner of the input image array). The multiplications from each convolutional iteration can be summed together to obtain a total sum for that iteration or node. The process is next continued at a next location in the input image according to the receptive field of a next node in the convolutional hidden layer 1622a. For example, a filter can be moved by a step amount to the next receptive field. The step amount can be set to 1 or other suitable amount. For example, if the step amount is set to 1, the filter will be moved to the right by 1 pixel at each convolutional iteration. Processing the filter at each unique location of the input volume produces a number representing the filter results for that location, resulting in a total sum value being determined for each node of the convolutional hidden layer 1622a.

The mapping from the input layer to the convolutional hidden layer 1622a is referred to as an activation map (or feature map). The activation map includes a value for each node representing the filter results at each locations of the input volume. The activation map can include an array that includes the various total sum values resulting from each iteration of the filter on the input volume. For example, the activation map will include a 24×24 array if a 5×5 filter is applied to each pixel (a step amount of 1) of a 28×28 input image. The convolutional hidden layer 1622a can include several activation maps in order to identify multiple features in an image. The example shown in FIG. 16 includes three activation maps. Using three activation maps, the convolutional hidden layer 1622a can detect three different kinds of features, with each feature being detectable across the entire image.

In some examples, a non-linear hidden layer can be applied after the convolutional hidden layer 1622a. The non-linear layer can be used to introduce non-linearity to a system that has been computing linear operations. One illustrative example of a non-linear layer is a rectified linear unit (ReLU) layer. A ReLU layer can apply the function $f(x)=\max(0, x)$ to all of the values in the input volume, which changes all the negative activations to 0. The ReLU can thus increase the non-linear properties of the network 1600 without affecting the receptive fields of the convolutional hidden layer 1622a.

The pooling hidden layer 1622b can be applied after the convolutional hidden layer 1622a (and after the non-linear hidden layer when used). The pooling hidden layer 1622b is used to simplify the information in the output from the convolutional hidden layer 1622a. For example, the pooling hidden layer 1622b can take each activation map output from the convolutional hidden layer 1622a and generates a condensed activation map (or feature map) using a pooling function. Max-pooling is one example of a function performed by a pooling hidden layer. Other forms of pooling functions be used by the pooling hidden layer 1622a, such as average pooling, L2-norm pooling, or other suitable pooling functions. A pooling function (e.g., a max-pooling filter, an L2-norm filter, or other suitable pooling filter) is applied to each activation map included in the convolutional hidden layer 1622a. In the example shown in FIG. 16, three pooling filters are used for the three activation maps in the convolutional hidden layer 1622a.

In some examples, max-pooling can be used by applying a max-pooling filter (e.g., having a size of 2×2) with a step amount (e.g., equal to a dimension of the filter, such as a step amount of 2) to an activation map output from the convolutional hidden layer 1622a. The output from a max-pooling filter includes the maximum number in every sub-region that the filter convolves around. Using a 2×2 filter as an example, each unit in the pooling layer can summarize a region of 2×2 nodes in the previous layer (with each node being a value in the activation map). For example, four values (nodes) in an activation map will be analyzed by a 2×2 max-pooling filter at each iteration of the filter, with the maximum value from the four values being output as the "max" value. If such a max-pooling filter is applied to an activation filter from the convolutional hidden layer 1622a having a dimension of 24×24 nodes, the output from the pooling hidden layer 1622b will be an array of 12×12 nodes.

In some examples, an L2-norm pooling filter could also be used. The L2-norm pooling filter includes computing the square root of the sum of the squares of the values in the 2×2 region (or other suitable region) of an activation map (instead of computing the maximum values as is done in max-pooling), and using the computed values as an output.

Intuitively, the pooling function (e.g., max-pooling, L2-norm pooling, or other pooling function) determines whether a given feature is found anywhere in a region of the image, and discards the exact positional information. This can be done without affecting results of the feature detection because, once a feature has been found, the exact location of the feature is not as important as its approximate location relative to other features. Max-pooling (as well as other pooling methods) offer the benefit that there are many fewer pooled features, thus reducing the number of parameters needed in later layers of the CNN 1600.

The final layer of connections in the network is a fully-connected layer that connects every node from the pooling hidden layer 1622b to every one of the output nodes in the output layer 1624. Using the example above, the input layer includes 28×28 nodes encoding the pixel intensities of the input image, the convolutional hidden layer 1622a includes 3×24×24 hidden feature nodes based on application of a 5×5 local receptive field (for the filters) to three activation maps, and the pooling layer 1622b includes a layer of 3×12×12 hidden feature nodes based on application of max-pooling filter to 2×2 regions across each of the three feature maps. Extending this example, the output layer 1624 can include ten output nodes. In such an example, every node of the 3×12×12 pooling hidden layer 1622b is connected to every node of the output layer 1624.

The fully connected layer 1622c can obtain the output of the previous pooling layer 1622b (which should represent the activation maps of high-level features) and determines the features that most correlate to a particular class. For example, the fully connected layer 1622c layer can determine the high-level features that most strongly correlate to a particular class, and can include weights (nodes) for the high-level features. A product can be computed between the weights of the fully connected layer 1622c and the pooling hidden layer 1622b to obtain probabilities for the different classes. For example, if the CNN 1600 is being used to predict that an object in a video frame is a person, high values will be present in the activation maps that represent high-level features of people (e.g., two legs are present, a face is present at the top of the object, two eyes are present at the top left and top right of the face, a nose is present in the middle of the face, a mouth is present at the bottom of the face, and/or other features common for a person).

In some examples, the output from the output layer 1624 can include an M-dimensional vector (in the prior example, M=10), where M can include the number of classes that the program has to choose from when classifying the object in the image. Other example outputs can also be provided. Each number in the N-dimensional vector can represent the probability the object is of a certain class. In one illustrative example, if a 10-dimensional output vector represents ten different classes of objects is [0 0 0.05 0.8 0 0.15 0 0 0 0], the vector indicates that there is a 5% probability that the image is the third class of object (e.g., a dog), an 80% probability that the image is the fourth class of object (e.g., a human), and a 15% probability that the image is the sixth class of object (e.g., a kangaroo). The probability for a class can be considered a confidence level that the object is part of that class.

As previously noted, the lens flare detection engine 308 can use any suitable neural network based detector. One example includes the SSD detector, which is a fast single-shot object detector that can be applied for multiple object categories or classes. The SSD model uses multi-scale convolutional bounding box outputs attached to multiple feature maps at the top of the neural network. Such a representation allows the SSD to efficiently model diverse box shapes. FIG. 17A includes an image and FIG. 17B and FIG. 17C include diagrams illustrating how an SSD detector (with the VGG deep network base model) operates. For example, SSD matches objects with default boxes of different aspect ratios (shown as dashed rectangles in FIG. 17B and FIG. 17C). Each element of the feature map has a number of default boxes associated with it. Any default box with an intersection-over-union with a ground truth box over a threshold (e.g., 0.4, 0.5, 0.6, or other suitable threshold) is considered a match for the object. For example, two of the 8×8 boxes (shown in blue in FIG. 17B) are matched with the cat, and one of the 4×4 boxes (shown in red in FIG. 17C) is matched with the dog. SSD has multiple features maps, with each feature map being responsible for a different scale of objects, allowing it to identify objects across a large range of scales. For example, the boxes in the 8×8 feature map of FIG. 17B are smaller than the boxes in the 4×4 feature map of FIG. 17C. In one illustrative example, an SSD detector can have six feature maps in total.

For each default box in each cell, the SSD neural network outputs a probability vector of length c, where c is the number of classes, representing the probabilities of the box containing an object of each class. In some cases, a background class is included that indicates that there is no object in the box. The SSD network also outputs (for each default box in each cell) an offset vector with four entries containing the predicted offsets required to make the default box match the underlying object's bounding box. The vectors are given in the format (cx, cy, w, h), with cx indicating the center x, cy indicating the center y, w indicating the width offsets, and h indicating height offsets. The vectors are only meaningful if there actually is an object contained in the default box. For the image shown in FIG. 17A, all probability labels would indicate the background class with the exception of the three matched boxes (two for the cat, one for the dog).

Figure 18C:
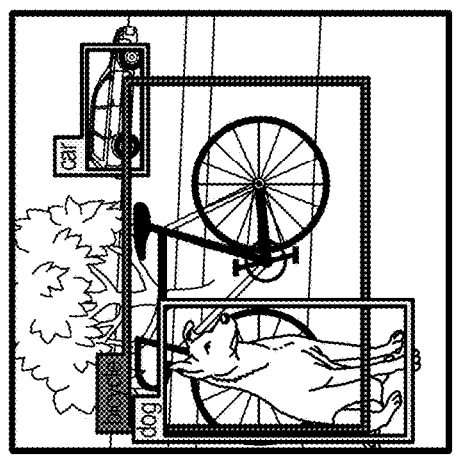
FIG. 18A-FIG. 18C are diagrams illustrating an example of a you only look once (YOLO) detector, in accordance with some examples.
Figure 18B:
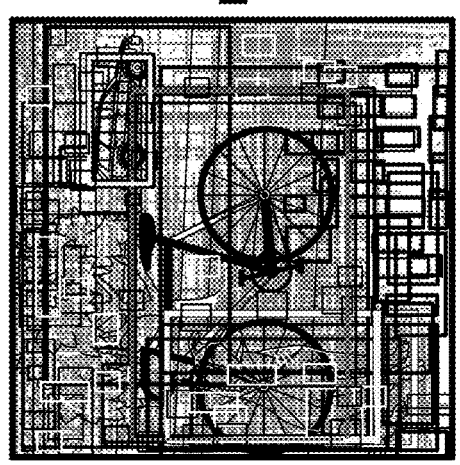
Figure 18A:
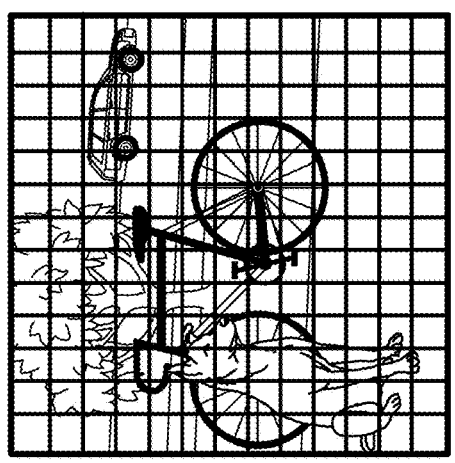

Another deep learning-based detector that can be used by the lens flare detection engine 308 to detect lens flare areas in images includes the You only look once (YOLO) detector, which is an alternative to the SSD object detection system. FIG. 18A includes an image and FIG. 18B and FIG. 18C include diagrams illustrating how the YOLO detector operates. The YOLO detector can apply a single neural network to a full image. As shown, the YOLO network divides the image into regions and predicts bounding boxes and probabilities for each region. These bounding boxes are weighted by the predicted probabilities. For example, as shown in FIG. 18A, the YOLO detector divides up the image into a grid of 13-by-13 cells. Each of the cells is responsible for predicting five bounding boxes. A confidence score is provided that indicates how certain it is that the predicted bounding box actually encloses an object. This score does not include a classification of the object that might be in the box, but indicates if the shape of the box is suitable. The predicted bounding boxes are shown in FIG. 18B. The boxes with higher confidence scores have thicker borders.

Each cell also predicts a class for each bounding box. For example, a probability distribution over all the possible classes is provided. Any number of classes can be detected, such as a bicycle, a dog, a cat, a person, a car, or other suitable object class. The confidence score for a bounding box and the class prediction are combined into a final score that indicates the probability that that bounding box contains a specific type of object. For example, the yellow box with thick borders on the left side of the image in FIG. 18B is 85% sure it contains the object class "dog." There are 169 grid cells (13×13) and each cell predicts 5 bounding boxes, resulting in 845 bounding boxes in total. Many of the bounding boxes will have very low scores, in which case only the boxes with a final score above a threshold (e.g., above a 30% probability, 40% probability, 50% probability, or other suitable threshold) are kept. FIG. 18C shows an image with the final predicted bounding boxes and classes, including a dog, a bicycle, and a car. As shown, from the 845 total bounding boxes that were generated, only the three bounding boxes shown in FIG. 18C were kept because they had the best final scores.

The lens flare removal operations discussed herein may be implemented using compressed images or using uncompressed images (before or after compression). An example video encoding and decoding system includes a source device that provides encoded video data to be decoded at a later time by a destination device. In particular, the source device provides the video data to destination device via a computer-readable medium. The source device and the destination device may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, the source device and the destination device may be equipped for wireless communication.

The destination device may receive the encoded video data to be decoded via the computer-readable medium. The computer-readable medium may comprise any type of medium or device capable of moving the encoded video data from source device to destination device. In one example, computer-readable medium may comprise a communication medium to enable source device to transmit encoded video data directly to destination device in real-time. The encoded video data may be modulated according to a communication standard, such as a wireless communication protocol, and transmitted to destination device. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device to destination device.

In some examples, encoded data may be output from output interface to a storage device. Similarly, encoded data may be accessed from the storage device by input interface. The storage device may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, the storage device may correspond to a file server or another intermediate storage device that may store the encoded video generated by source device. Destination device may access stored video data from the storage device via streaming or download. The file server may be any type of server capable of storing encoded video data and transmitting that encoded video data to the destination device. Example file servers include a web server (e.g., for a website), an FTP server, network attached storage (NAS) devices, or a local disk drive. Destination device may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage device may be a streaming transmission, a download transmission, or a combination thereof.

The techniques of this disclosure are not necessarily limited to wireless applications or settings. The techniques may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, system may be configured to support one-way or two-way video transmission to support applications such as video streaming, video playback, video broadcasting, and/or video telephony.

In one example, the source device includes a video source, a video encoder, and a output interface. The destination device may include an input interface, a video decoder, and a display device. The video encoder of source device may be configured to apply the techniques disclosed herein. In other examples, a source device and a destination device may include other components or arrangements. For example, the source device may receive video data from an external video source, such as an external camera. Likewise, the destination device may interface with an external display device, rather than including an integrated display device.

The example system above merely one example. Techniques for processing video data in parallel may be performed by any digital video encoding and/or decoding device. Although generally the techniques of this disclosure are performed by a video encoding device, the techniques may also be performed by a video encoder/decoder, typically referred to as a "CODEC." Moreover, the techniques of this disclosure may also be performed by a video preprocessor. Source device and destination device are merely examples of such coding devices in which source device generates coded video data for transmission to destination device. In some examples, the source and destination devices may operate in a substantially symmetrical manner such that each of the devices include video encoding and decoding components. Hence, example systems may support one-way or two-way video transmission between video devices, e.g., for video streaming, video playback, video broadcasting, or video telephony.

The video source may include a video capture device, such as a video camera, a video archive containing previously captured video, and/or a video feed interface to receive video from a video content provider. As a further alternative, the video source may generate computer graphics-based data as the source video, or a combination of live video, archived video, and computer-generated video. In some cases, if video source is a video camera, source device and destination device may form so-called camera phones or video phones. As mentioned above, however, the techniques described in this disclosure may be applicable to video coding in general, and may be applied to wireless and/or wired applications. In each case, the captured, pre-captured, or computer-generated video may be encoded by the video encoder. The encoded video information may then be output by output interface onto the computer-readable medium.

As noted, the computer-readable medium may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from the source device and provide the encoded video data to the destination device, e.g., via network transmission. Similarly, a computing device of a medium production facility, such as a disc stamping facility, may receive encoded video data from the source device and produce a disc containing the encoded video data. Therefore, the computer-readable medium may be understood to include one or more computer-readable media of various forms, in various examples.

In the foregoing description, aspects of the application are described with reference to specific embodiments thereof, but those skilled in the art will recognize that the application is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described subject matter may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

The various illustrative logical blocks, modules, circuits, and algorithm steps described in connection with the embodiments disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for encoding and decoding, or incorporated in a combined video encoder-decoder (CODEC).

What is claimed is:

1. A method of processing a plurality of images, the method comprising:
    obtaining a first image captured using a first aperture setting;
    obtaining a second image captured using a second aperture setting, the first aperture setting being associated with a smaller aperture size than an aperture size associated with the second aperture setting;
    detecting pixels of the first image having lens flare; and
    generating an output image by combining the first image and the second image, the first image and the second image being combined by replacing the pixels of the first image having the lens flare with corresponding pixels of the second image.

2. The method of claim 1, wherein the first image and the second image are captured at a same exposure.

3. The method of claim 2, wherein the first image and the second image are captured at the same exposure by adjusting a shutter speed of at least one camera.

4. The method of claim 1, further comprising:
generating a binary image mask based on pixels of the first image, the binary image mask including a first value for the pixels of the first image that have the lens flare and a second value for pixels in the first image that do not have the lens flare; and
combining the first image and the second image using the binary image mask.

5. The method of claim 4, wherein combining the first image and the second image using the binary image mask includes using one or more of a value of a pixel of the first image or a value of a corresponding pixel of the second image for a corresponding pixel of the output image based on a value determined for a corresponding pixel of the binary image mask; and
wherein the pixel of the first image has a same location as a location of the corresponding pixel of the second image and a location of the corresponding pixel of the binary image mask.

6. The method of claim 5, wherein the value determined for the corresponding pixel of the binary image mask includes the first value or the second value.

7. The method of claim 5, wherein the value determined for the corresponding pixel of the binary image mask indicates a percentage of the corresponding pixel of the second image to use for the corresponding pixel of the output image; and
wherein the corresponding pixel of the output image has a same location as the location of the corresponding pixel of the second image.

8. The method of claim 5, further comprising determining the value for the corresponding pixel of the binary image mask using an initial value of the corresponding pixel of the binary image mask and values of a plurality of pixels neighboring the corresponding pixel of the binary image mask.

9. The method of claim 8, wherein the value for the corresponding pixel of the binary image mask is determined by averaging the initial value of the corresponding pixel of the binary image mask and the values of the plurality of pixels neighboring the corresponding pixel of the binary image mask.

10. The method of claim 8, wherein the value for the corresponding pixel of the binary image mask is included in a blurred image mask.

11. The method of claim 1, further comprising:
aligning the first image and the second image;
color matching the aligned first image and the second image; and
detecting the pixels of the first image having the lens flare after the first image and the second image are color matched.

12. The method of claim 1, further comprising:
refocusing a focus point of a camera to a point within a lens flare area of the first image, the lens flare area corresponding to the pixels of the first image having the lens flare; and
capturing the second image using the refocused focus point.

13. An apparatus for processing a plurality of images, the apparatus comprising:
a memory device that stores a plurality of images including a first image captured using a first aperture setting and a second image captured using a second aperture setting, the first aperture setting being associated with a smaller aperture size than an aperture size associated with the second aperture setting; and
a hardware processor configured to:
obtain the first image;
obtain the second image; and
generate an output image by combining the first image and the second image, the first image and the second image being combined by replacing the pixels of the first image having the lens flare with corresponding pixels of the second image.

14. The apparatus of claim 13, wherein the first image and the second image are captured at a same exposure.

15. The apparatus of claim 14, wherein the first image and the second image are captured at the same exposure by adjusting a shutter speed of at least one camera.

16. The apparatus of claim 13, wherein the hardware processor is further configured to:
generate a binary image mask based on pixels of the first image, the binary image mask including a first value for the pixels of the first image that have the lens flare and a second value for pixels in the first image that do not have the lens flare; and
combine the first image and the second image using the binary image mask.

17. The apparatus of claim 16, wherein the hardware processor is configured to combine the first image and the second image using the binary image mask includes using one or more of a value of a pixel of the first image or a value of a corresponding pixel of the second image for a corresponding pixel of the output image based on a value determined for a corresponding pixel of the binary image mask; and
wherein the pixel of the first image has a same location as a location of the corresponding pixel of the second image and a location of the corresponding pixel of the binary image mask.

18. The apparatus of claim 17, wherein the value determined for the corresponding pixel of the binary image mask includes the first value or the second value.

19. The apparatus of claim 17, wherein the value determined for the corresponding pixel of the binary image mask indicates a percentage of the corresponding pixel of the second image to use for the corresponding pixel of the output image; and
wherein the corresponding pixel of the output image has a same location as the location of the corresponding pixel of the second image.

20. The apparatus of claim 17, wherein the hardware processor is further configured to determine the value for the corresponding pixel of the binary image mask using an initial value of the corresponding pixel of the binary image mask and values of a plurality of pixels neighboring the corresponding pixel of the binary image mask.

21. The apparatus of claim 20, wherein the value for the corresponding pixel of the binary image mask is determined by averaging the initial value of the corresponding pixel of the binary image mask and the values of the plurality of pixels neighboring the corresponding pixel of the binary image mask.

22. The apparatus of claim 20, wherein the value for the corresponding pixel of the binary image mask is included in a blurred image mask.

23. The apparatus of claim 13, wherein the hardware processor is further configured to:
align the first image and the second image;

color match the aligned first image and the second image; and detect the pixels of the first image having the lens flare after the first image and the second image are color matched.

24. The apparatus of claim 13, wherein the hardware processor is further configured to:

refocus a focus point of a camera to a point within a lens flare area of the first image, the lens flare area corresponding to the pixels of the first image having the lens flare; and capture the second image using the refocused focus point.

25. A non-transitory computer readable medium having stored thereon instructions that, when executed by one or more processors, cause the one or more processors to:

obtain a first image captured using a first aperture setting;

obtain a second image captured using a second aperture setting, the first aperture setting being associated with a smaller aperture size than an aperture size associated with the second aperture setting;

detect pixels of the first image having lens flare; and generate an output image by combining the first image and the second image, the first image and the second image being combined by replacing the pixels of the first image having the lens flare with corresponding pixels of the second image.

26. The non-transitory computer readable medium of claim 25, further comprising instructions that, when executed by one or more processors, cause the one or more processors to:

generate a binary image mask based on pixels of the first image, the binary image mask including a first value for the pixels of the first image that have the lens flare and a second value for pixels in the first image that do not have the lens flare; and combine the first image and the second image using the binary image mask.

27. The non-transitory computer readable medium of claim 26, wherein combining the first image and the second image using the binary image mask includes using one or more of a value of a pixel of the first image or a value of a corresponding pixel of the second image for a corresponding pixel of the output image based on a value determined for a corresponding pixel of the binary image mask; and wherein the pixel of the first image has a same location as a location of the corresponding pixel of the second image and a location of the corresponding pixel of the binary image mask.

28. The non-transitory computer readable medium of claim 27, wherein the value determined for the corresponding pixel of the binary image mask includes the first value or the second value.

29. The non-transitory computer readable medium of claim 27, further comprising instructions that, when executed by one or more processors, cause the one or more processors to:

determine the value for the corresponding pixel of the binary image mask using an initial value of the corresponding pixel of the binary image mask and values of a plurality of pixels neighboring the corresponding pixel of the binary image mask, wherein the value for the corresponding pixel of the binary image mask is determined by averaging the initial value of the corresponding pixel of the binary image mask and the values of the plurality of pixels neighboring the corresponding pixel of the binary image mask; and wherein the value for the corresponding pixel of the binary image mask is included in a blurred image mask.

30. An apparatus for processing a plurality of images, the apparatus comprising:

means for obtaining a first image captured using a first aperture setting;

means for obtaining a second image captured using a second aperture setting, the first aperture setting being associated with a smaller aperture size than an aperture size associated with the second aperture setting;

means for detecting pixels of the first image having lens flare; and means for generating an output image by combining the first image and the second image, the first image and the second image being combined by replacing the pixels of the first image having the lens flare with corresponding pixels of the second image.

* * * * *